US012763822B2

(12) United States Patent
Duan et al.

(10) Patent No.: US 12,763,822 B2
(45) **Date of Patent: *Oct. 13, 2026**

(54) JOINT MULTIPLE-INPUT MULTIPLE-OUTPUT (MIMO) COMMUNICATIONS AND MIMO SENSING

(71) Applicant: QUALCOMM Incorporated, San Diego, CA (US)

(72) Inventors: Weimin Duan, San Diego, CA (US); Hyojin Lee, San Diego, CA (US); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/757,303

(22) Filed: Jun. 27, 2024

(65) Prior Publication Data

US 2024/0429977 A1 Dec. 26, 2024

Related U.S. Application Data

(63) Continuation of application No. 17/846,901, filed on Jun. 22, 2022, now Pat. No. 12,052,073.

(51) Int. Cl.
*H04B 7/0456* (2017.01)
*H04B 7/0417* (2017.01)
(Continued)

(52) U.S. Cl.
CPC ......... *H04B 7/0478* (2013.01); *H04B 7/0417* (2013.01); *H04B 7/0639* (2013.01); *H04B 7/0452* (2013.01)

(58) Field of Classification Search
CPC .. H04B 7/0478; H04B 7/0417; H04B 7/0639; H04B 7/0452
See application file for complete search history.

(56) References Cited

U.S. PATENT DOCUMENTS

2023/0232273 A1* 7/2023 Mandelli ........... H04W 28/0268 370/329
2023/0284122 A1* 9/2023 Khosravirad ......... H04W 48/16 370/252

(Continued)

OTHER PUBLICATIONS

International Search Report and Written Opinion—PCT/US2023/067315—ISA/EPO—Aug. 28, 2023.

(Continued)

*Primary Examiner* — Jaison Joseph
(74) *Attorney, Agent, or Firm* — QUALCOMM Incorporated

(57) ABSTRACT

Disclosed are systems, apparatuses, processes, and computer-readable media for wireless communications. For example, an example of a process may include receiving, at a network device (e.g., a user equipment (UE)) from a network entity via a number of sensing streams based on a maximum of $N_t$−J sensing streams, a waveform including communications resources and sensing resources. The waveform has a rank $N_t$ and J is a number of layers scheduled for multiple-input multiple-output (MIMO) communications that is less than $N_t$. The process may further include processing at least the communications resources of the waveform.

20 Claims, 18 Drawing Sheets

(51) Int. Cl.
*H04B 7/0452* (2017.01)
*H04B 7/06* (2006.01)

(56) References Cited

U.S. PATENT DOCUMENTS

| | | | | |
|---|---|---|---|---|
| 2023/0362898 | A1* | 11/2023 | Jeon | G01S 7/0235 |
| 2023/0421215 | A1 | 12/2023 | Duan | |
| 2024/0429977 | A1* | 12/2024 | Duan | H04B 7/0639 |

OTHER PUBLICATIONS

Yuan X., et al., "Spatio-temporal Power Optimization for MIMO Joint Communication and Radio Sensing Systems with Training Overhead", IEEE Transactions on Vehicular Technology, IEEE, USA, vol. 70, No. 1, Dec. 22, 2020, pp. 514-528, XP011837402, Abstract sections I, II, p. 514-p. 517, figures 1, 2.

* cited by examiner

1300

JOINT MULTIPLE-INPUT MULTIPLE-OUTPUT (MIMO) COMMUNICATIONS AND MIMO SENSING

CROSS-REFERENCE TO RELATED APPLICATION

This application is a continuation of U.S. Non-Provisional patent application Ser. No. 17/846,901, filed Jun. 22, 2022, the disclosure of which is incorporated herein in its entirety by this reference.

FIELD OF THE DISCLOSURE

The present disclosure generally relates to joint communications and sensing. For example, aspects of the present disclosure relate to joint multiple-input multiple-output (MIMO) communications and MIMO sensing.

BACKGROUND OF THE DISCLOSURE

Wireless communications systems are widely deployed to provide various types of communication content, such as voice, video, packet data, messaging, and broadcast. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some wireless communications systems may support communications between UEs, which may involve direct transmissions between two or more UEs.

Due to larger bandwidths being allocated for wireless cellular communications systems (e.g., including 5G and 5G beyond) and more use cases being introduced into the cellular communications systems, joint MIMO communications and MIMO sensing can be an essential feature for existing or future wireless communication systems, such as to enhance the overall spectral efficiency of the wireless communication networks.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Systems and techniques are described for joint MIMO communications and MIMO sensing at a user equipment (UE). According to at least one example, a method is provided for wireless communications. The method includes: receiving, at the UE from a network entity via a number of sensing streams based on a maximum of $N_t$–J sensing streams, a waveform comprising communications resources and sensing resources, the waveform having a rank $N_t$, wherein J is a number of layers scheduled for multiple-input multiple-output (MIMO) communications and is less than $N_t$; and processing at least the communications resources of the waveform.

In another example, an apparatus for wireless communications is provided that includes at least one memory and at least one processor coupled to the at least one memory. The at least one processor is configured to: receive, from a network entity via a number of sensing streams based on a maximum of $N_t$–J sensing streams, a waveform comprising communications resources and sensing resources, the waveform having a rank $N_t$, wherein J is a number of layers scheduled for multiple-input multiple-output (MIMO) communications and is less than $N_t$; and process at least the communications resources of the waveform.

In another example, a non-transitory computer-readable medium is provided that has stored thereon instructions that, when executed by one or more processors, cause the one or more processors to: receive, from a network entity via a number of sensing streams based on a maximum of $N_t$–J sensing streams, a waveform comprising communications resources and sensing resources, the waveform having a rank $N_t$, wherein J is a number of layers scheduled for multiple-input multiple-output (MIMO) communications and is less than $N_t$; and process at least the communications resources of the waveform.

In another example, an apparatus for wireless communications is provided. The apparatus includes: means for receiving, from a network entity via a number of sensing streams based on a maximum of $N_t$–J sensing streams, a waveform comprising communications resources and sensing resources, the waveform having a rank $N_t$, wherein J is a number of layers scheduled for multiple-input multiple-output (MIMO) communications and is less than $N_t$; and means for processing at least the communications resources of the waveform.

According to one or more other examples, a method is provided for wireless communications at a network entity. The method includes: generating, at the network entity, a waveform comprising communications resources and sensing resources based on a maximum of $N_t$–J sensing streams, the waveform having a rank $N_t$, wherein the network entity comprises $N_t$ number of transmitting antenna elements, and wherein J is a number of layers scheduled for multiple-input multiple-output (MIMO) communications and is less than $N_t$; and transmitting, via a number of sensing streams based on the maximum of $N_t$–J sensing streams, the waveform to one or more network devices for MIMO communications and MIMO sensing.

In another example, an apparatus for wireless communications is provided that includes at least one memory and at least one processor coupled to the at least one memory. The at least one processor is configured to: generate a waveform comprising communications resources and sensing resources based on a maximum of $N_t$–J sensing streams, the waveform having a rank $N_t$, wherein the apparatus comprises $N_t$ number of transmitting antenna elements, and wherein J is a number of layers scheduled for multiple-input multiple-output (MIMO) communications and is less than $N_t$; and transmit, via a number of sensing streams based on the maximum of $N_t$−J sensing streams, the waveform to one or more network devices for MIMO communications and MIMO sensing.

In another example, a non-transitory computer-readable medium is provided that has stored thereon instructions that, when executed by one or more processors, cause the one or more processors to: generate a waveform comprising communications resources and sensing resources based on a maximum of $N_t$−J sensing streams, the waveform having a rank $N_t$, wherein the apparatus comprises $N_t$ number of transmitting antenna elements, and wherein J is a number of layers scheduled for multiple-input multiple-output (MIMO) communications and is less than $N_t$; and transmit, via a number of sensing streams based on the maximum of $N_t$−J sensing streams, the waveform to one or more network devices for MIMO communications and MIMO sensing.

In another example, an apparatus for wireless communications is provided. The apparatus includes: means for generating a waveform comprising communications resources and sensing resources based on a maximum of $N_t$−J sensing streams, the waveform having a rank $N_t$, wherein the apparatus comprises $N_t$ number of transmitting antenna elements, and wherein J is a number of layers scheduled for multiple-input multiple-output (MIMO) communications and is less than $N_t$; and means for transmitting, via a number of sensing streams based on the maximum of $N_t$−J sensing streams, the waveform to one or more network devices for MIMO communications and MIMO sensing.

In some aspects, the apparatus is, is part of, and/or includes a UE, such as a mobile device (e.g., a mobile telephone and/or mobile handset and/or so-called "smart phone" or other mobile device), an extended reality (XR) device (e.g., a virtual reality (VR) device, an augmented reality (AR) device, or a mixed reality (MR) device such as a head-mounted display (HMD) device), a wearable device (e.g., a network-connected watch or other wearable device), a wireless communication device, a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1A:
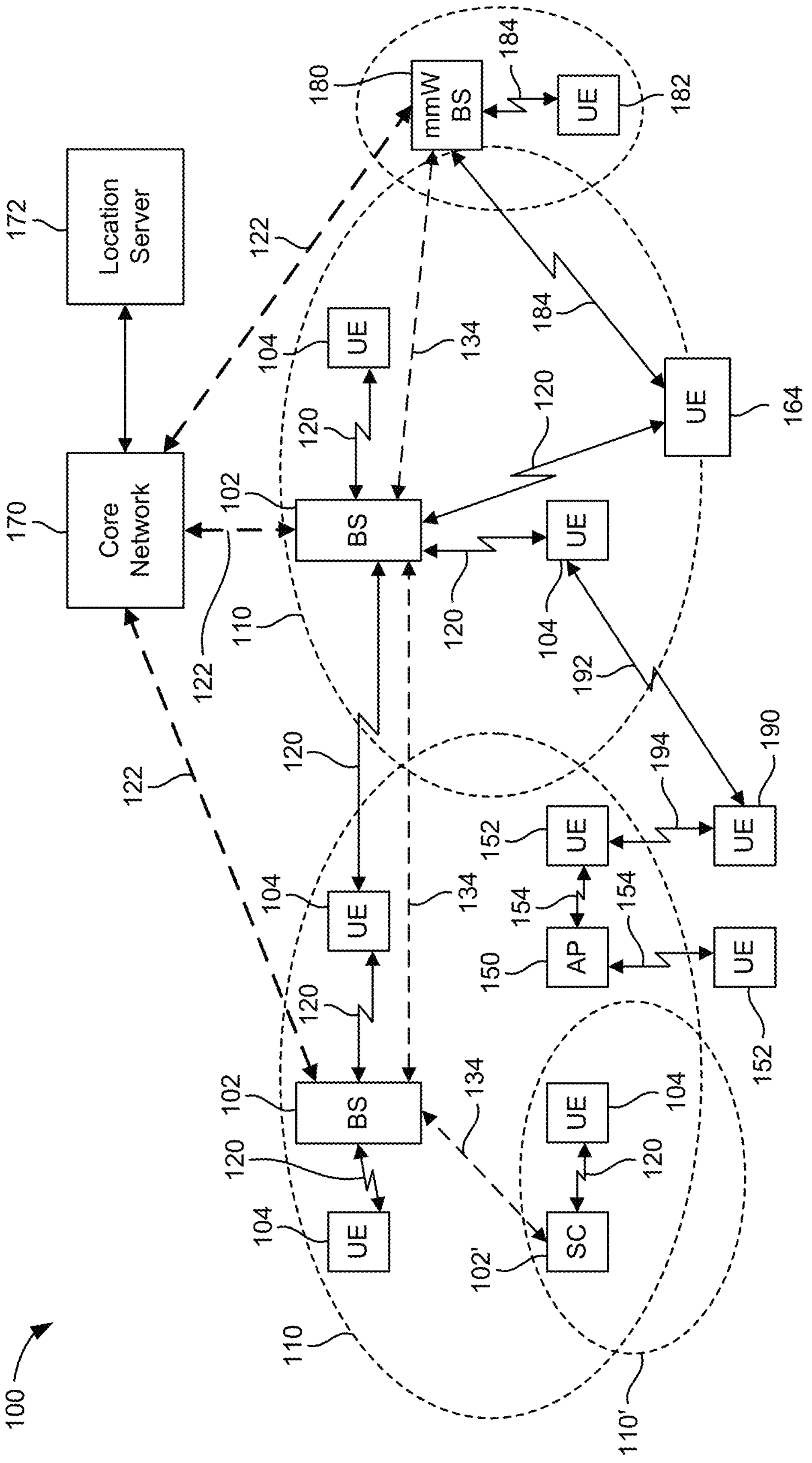
FIG. 1A is a diagram illustrating an example wireless communications system, which may be employed by the disclosed systems and techniques for joint MIMO communications and MIMO sensing, in accordance with some aspects of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

As previously mentioned, due to larger bandwidths being allocated for wireless communications systems (e.g., including cellular communications systems such as 4G/LTE, 5G/NR, and beyond) and more use cases being introduced into the wireless communications systems, joint multiple-input multiple-output (MIMO) communications and MIMO sensing can be an essential feature for wireless communications systems.

Radar sensing systems typically use radio frequency (RF) waveforms to perform RF sensing to determine or estimate one or more characteristics of a target object, such as the distance, angle, and/or velocity of the target object. A target object may include a vehicle, an obstruction, a user, a building, or other object. A typical radar system includes at least one transmitter, at least one receiver, and at least one processor. A radar sensing system may perform monostatic sensing when one receiver is employed that is co-located with a transmitter. A radar system may perform bistatic sensing when one receiver of a first device is employed that is located remote from a transmitter of a second device. Similarly, a radar system may perform multi-static sensing when multiple receivers of multiple devices are employed that are all located remotely from at least one transmitter of at least one device.

During operation of a radar sensing system, a transmitter transmits an electromagnetic (EM) signal in the RF domain towards a target object. The signal reflects off of the target object to produce one or more reflection signals, which provides information or properties regarding the target, such as target object's location and speed. At least one receiver receives the one or more reflection signals and at least one processor, which may be associated with at least one receiver, utilizes the information from the one or more reflection signals to determine information or properties of the target object. A target object can also be referred herein as a target.

It should be noted that these radar sensing signals, which can be referred to as radar reference signals (RSs), are typically designed for and solely used for sensing purposes. Radar RSs do not contain any communications information. Conversely, communication RSs are typically designed for and solely used for communications purposes, including estimating channel parameters for communications.

Cellular communications systems are designed to transmit communications signals on designated communications frequency bands (e.g., 23 gigahertz (GHz), 3.5 GHz, etc. for 5G/NR, 2.2 GHz for LTE, among others). RF sensing systems are designed to transmit RF sensing signals on designated radar RF frequency bands (e.g., 77 GHz for autonomous driving). The spectrum for communication and sensing is very likely to be shared in future cellular communication systems, in which case the communications and sensing should be jointly considered.

MIMO is a multi-antenna spectrum-efficient technique, and has become a leading driver of next-generation antenna technology for cellular networks. A MIMO system may transmit more than one signal over the same channel, providing for an increase in spectral efficiency and overall throughput. By taking advantage of spatial separation, the antennas of a MIMO system are spaced at specific distances and angles to compensate for self-interference. A MIMO system can provide a robust wireless communication mechanism to address fading and shadowing caused by multiple transmission paths and long distances. In a MIMO system, various streams of data can be transmitted at the same time, which can provide for multiplexing gains and an improvement in the overall throughput. For at least these reasons, MIMO has been recently employed in cellular wireless communications technology and is included in various next-generation wireless projects and standards, including 5G NR.

A simple form of MIMO is point-to-point MIMO. In point-to-point MIMO, two systems (e.g., a base station and a UE) each employ multiple antennas to communicate with each other. The use of multiple antennas provides for an increase in the capacity of the air interface. However, point-to-point MIMO employs a multi-antenna configuration that requires additional hardware at both the base station and the end-user device (e.g., in the UE). The requirement of additional hardware at both the base station and the user device is a disadvantage to point-to-point MIMO because it increases the overall system complexity. It should be noted that, in a typical mobile communications system, the end-user equipment (e.g., UE) may not be able to support multiple antennas due to its small physical size and/or the low-cost requirements of the UE devices.

An enhancement of point-to-point MIMO is single-user MIMO (SU-MIMO), which provides for an increase in the data rate by transmitting multiple data streams to a specific user device (e.g., specific UE). Similar to point-to-point MIMO, SU-MIMO has the drawback of requiring the user device (e.g., UE) to support multiple antennas.

Conversely to point-to-point MIMO and SU-MIMO, multiple-user MIMO (MU-MIMO) does not have the disadvantage of requiring the user device to support multiple antennas. In MU-MIMO, multiple users share the same time and frequency resources, while each base station (e.g., a next generation node B (gNB), evolved node B (eNB), or portion thereof such as a central unit (CU), a distributed unit (DU), a radio unit (RU), a Near-Real Time (Near-RT) RAN Intelligent Controller (RIC), or a Non-Real Time (Non-RT) RIC) is equipped with multiple antennas (e.g., antenna arrays) and serves many users (e.g., UEs) simultaneously. Each end-user device (e.g., UE) need only employ a single antenna and, as such, complex hardware is only needed at the base station side. The cost and complexity of the antenna system are significantly reduced for a MU-MIMO system because low-cost single antennas (e.g., dipole antennas) may be employed for the end-user devices (e.g., UEs), and the more expensive, complex hardware may be utilized only at the base station side.

Due to the variety in the distance, angle, and quality of the signals of the multiple users in MU-MIMO systems, the performance of MU-MIMO systems is generally less affected by the transmission environment as compared to point-to-point MIMO. This advantage is achieved by MU-MIMO systems employing selective beamforming and power control to cancel interference. MU-MIMO systems offer high reliability and throughput and, as such, have become an integral part of wireless communication systems, including Wi-Fi, LTE, and 5G networks.

Massive MIMO (mMIMO) is a form a MU-MIMO that employs a larger number of antennas at the base stations than MU-MIMO and, as such, the number of users (e.g., UEs) served can be increased significantly over MU-MIMO systems (e.g., in mMIMO, a single base station with many antennas can serve a large number of users). With a large number of antennas in each base station, the channel vectors between users (e.g., UEs) and the base station are per pair almost rectangular and, as such, can provide for exceptional linear transmissions. In mMIMO, a large throughput can be achieved due to multiplexing gain, diversity gain, and array gain. The large number of antennas at the base stations, in mMIMO, may serve hundreds of users with the same frequency resource by taking advantage of antenna beamforming techniques.

In mMIMO, the more antennas employed for each base station, the more robust the communications operation. Theoretically, mMIMO may employ an infinite number of antennas at each of the base stations. But, usually (e.g., in 5G networks), 64 to 128 (e.g., 64 receive antennas and 64 transmit antennas) antennas have been utilized practically in mMIMO base stations. A prominent advantage of mMIMO is that sophisticated hardware is only needed at the base stations, not at the user devices (e.g., UEs), which each only require a single antenna and a simple antenna design. Another advantage of mMIMO is that it has an extensible architecture that can be easily scaled up to serve more users by only needing to upgrade the antenna systems on the base stations.

In some aspects of the present disclosure, systems, apparatuses, methods (also referred to as processes), and computer-readable media (collectively referred to herein as "systems and techniques") are described herein that provide for joint MIMO communications and MIMO sensing. In one or more examples, the systems and techniques of the present disclosure employ a unified waveform for both communications and sensing, which may be referred to as a "joint communications and sensing (JCS) waveform," with a MU-MIMO and/or mMIMO systems architecture. One advantage of such a JCS waveform is that it provides a high spectral efficiency since the spectrum can be fully reused. Another advantage is that such JCS waveform allows for unified hardware that can be utilized for both communications and sensing. Additional details regarding the disclosed systems and techniques for joint MIMO communications and MIMO sensing, as well as specific implementations, are described below with respect to the figures.

Additional aspects of the present disclosure are described in more detail below.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IOT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical Transmission-Reception Point (TRP) or to multiple physical Transmission-Reception Points (TRPs) that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal includes an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1A illustrates an exemplary wireless communications system 100, which may be employed by the disclosed systems and techniques for joint MIMO communications and MIMO sensing, in accordance with some aspects of the present disclosure. The wireless communications system 100 (which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IOT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHZ with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node or entity (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receiving beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain of other beams available to the receiver. This results in a stronger received signal strength, (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a network node or entity (e.g., a base station). The UE can then form a transmit beam for sending one or more uplink reference signals (e.g., uplink positioning reference signals (UL-PRS), sounding reference signal (SRS), demodulation reference signals (DMRS), PTRS, etc.) to that network node or entity (e.g., a base station) based on the parameters of the receive beam.

Note that a "downlink" beam may be either a transmit beam or a receive beam, depending on the entity forming it. For example, if a network node or entity (e.g., a base station) is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a network node or entity (e.g., a base station) is forming the uplink beam, it is an uplink receive beam, and if a UE is forming the uplink beam, it is an uplink transmit beam.

In 5G, the frequency spectrum in which wireless network nodes or entities (e.g., base stations 102/180, UEs 104/182) operate is divided into multiple frequency ranges, FR1 (from 450 to 6000 Megahertz (MHz)), FR2 (from 24250 to 52600 MHZ), FR3 (above 52600 MHZ), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1A, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHZ) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHZ aggregated carriers in a multi-carrier system would theoretically lead to a two-fold increase in data rate (i.e., 40 MHz), compared to that attained by a single 20 MHz carrier.

In order to operate on multiple carrier frequencies, a base station 102 and/or a UE 104 is equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1A, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 1B:
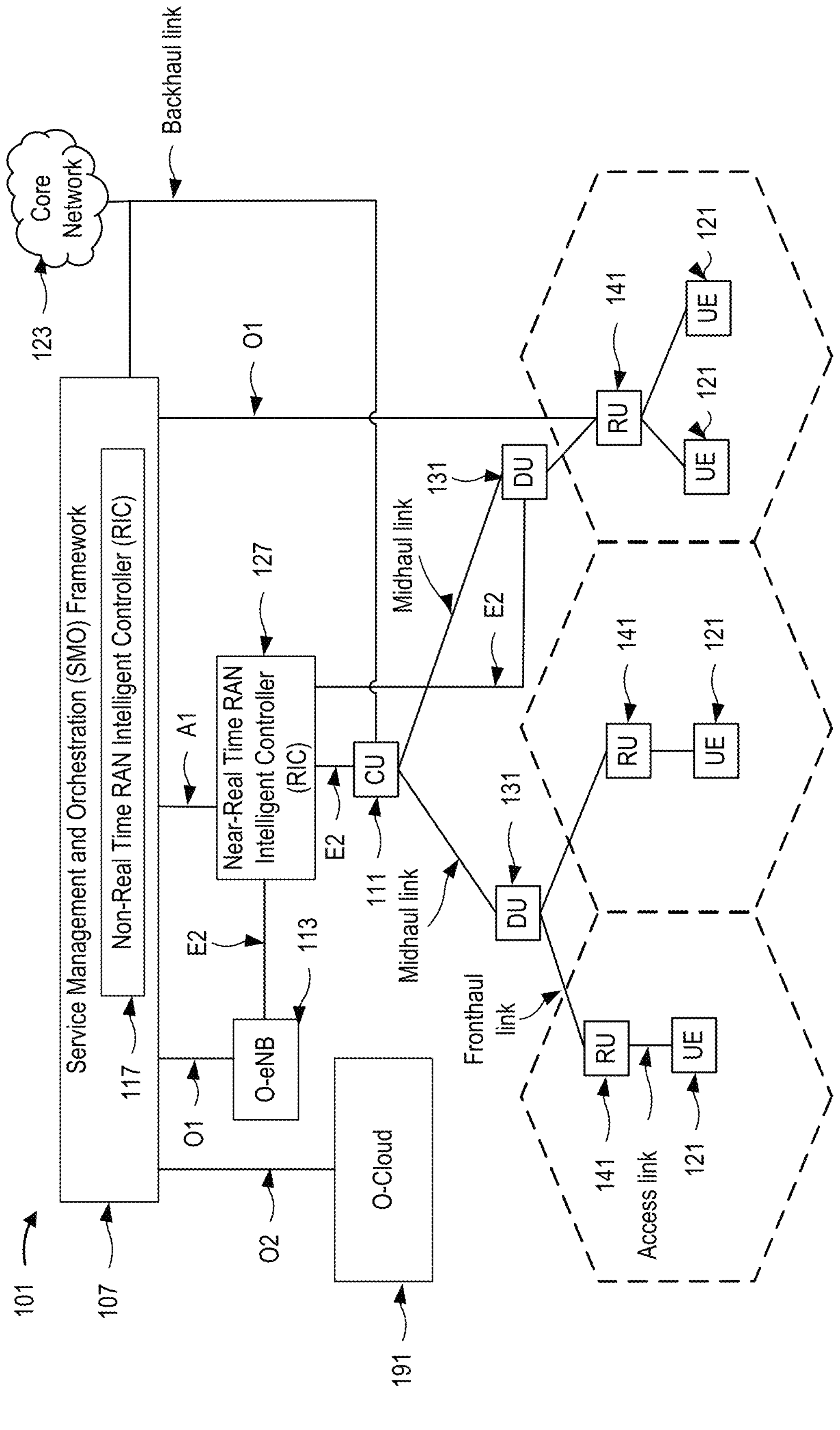
FIG. 1B is a diagram illustrating an example of a disaggregated base station architecture, which may be employed by the disclosed systems and techniques for joint MIMO communications and MIMO sensing, in accordance with some aspects of the present disclosure.

FIG. 1B is a diagram illustrating an example of a disaggregated base station architecture, which may be employed by the disclosed systems and techniques for joint MIMO communications and MIMO sensing, in accordance with some aspects of the present disclosure. Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, AP, a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

As previously mentioned, FIG. 1B shows a diagram illustrating an example disaggregated base station 101 architecture. The disaggregated base station 101 architecture may include one or more central units (CUs) 111 that can communicate directly with a core network 123 via a backhaul link, or indirectly with the core network 123 through one or more disaggregated base station units (such as a Near-Real Time (Near-RT) RAN Intelligent Controller (RIC) 127 via an E2 link, or a Non-Real Time (Non-RT) RIC 117 associated with a Service Management and Orchestration (SMO) Framework 107, or both). A CU 111 may communicate with one or more distributed units (DUs) 131 via respective midhaul links, such as an F1 interface. The DUs 131 may communicate with one or more radio units (RUS) 141 via respective fronthaul links. The RUs 141 may communicate with respective UEs 121 via one or more RF access links. In some implementations, the UE 121 may be simultaneously served by multiple RUs 141.

Each of the units, i.e., the CUS 111, the DUs 131, the RUs 141, as well as the Near-RT RICs 127, the Non-RT RICs 117 and the SMO Framework 107, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 111 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 111. The CU 111 may be configured to handle user plane functionality (i.e., Central Unit-User Plane (CU-UP)), control plane functionality (i.e., Central Unit-Control Plane (CU-CP)), or a combination thereof. In some implementations, the CU 111 can be logically split into one or more CU-UP units and one or more CU-CP units. The CU-UP unit can communicate bidirectionally with the CU-CP unit via an interface, such as the E1 interface when implemented in an O-RAN configuration. The CU 111 can be implemented to communicate with the DU 131, as necessary, for network control and signaling.

The DU 131 may correspond to a logical unit that includes one or more base station functions to control the operation of one or more RUs 141. In some aspects, the DU 131 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 131 may further host one or more low PHY layers. Each layer (or module) can be implemented with an interface configured to communicate signals with other layers (and modules) hosted by the DU 131, or with the control functions hosted by the CU 111.

Lower-layer functionality can be implemented by one or more RUs 141. In some deployments, an RU 141, controlled by a DU 131, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 141 can be implemented to handle over the air (OTA) communication with one or more UEs 121. In some implementations, real-time and non-real-time aspects of control and user plane communication with the RU(s) 141 can be controlled by the corresponding DU 131. In some scenarios, this configuration can enable the DU(s) 131 and the CU 111 to be implemented in a cloud-based RAN architecture, such as a vRAN architecture.

The SMO Framework 107 may be configured to support RAN deployment and provisioning of non-virtualized and virtualized network elements. For non-virtualized network elements, the SMO Framework 107 may be configured to support the deployment of dedicated physical resources for RAN coverage requirements which may be managed via an operations and maintenance interface (such as an O1 interface). For virtualized network elements, the SMO Framework 107 may be configured to interact with a cloud computing platform (such as an open cloud (O-Cloud) 191) to perform network element life cycle management (such as to instantiate virtualized network elements) via a cloud computing platform interface (such as an O2 interface). Such virtualized network elements can include, but are not limited to, CUs 111, DUs 131, RUS 141 and Near-RT RICs 127. In some implementations, the SMO Framework 107 can communicate with a hardware aspect of a 4G RAN, such as an open eNB (O-eNB) 113, via an O1 interface. Additionally, in some implementations, the SMO Framework 107 can communicate directly with one or more RUs 141 via an O1 interface. The SMO Framework 107 also may include a Non-RT RIC 117 configured to support functionality of the SMO Framework 107.

The Non-RT RIC 117 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 127. The Non-RT RIC 117 may be coupled to or communicate with (such as via an A1 interface) the Near-RT RIC 127. The Near-RT RIC 127 may be configured to include a logical function that enables near-real-time control and optimization of RAN elements and resources via data collection and actions over an interface (such as via an E2 interface) connecting one or more CUs 111, one or more DUs 131, or both, as well as an O-NB 113, with the Near-RT RIC 127.

In some implementations, to generate AI/ML models to be deployed in the Near-RT RIC 127, the Non-RT RIC 117 may receive parameters or external enrichment information from external servers. Such information may be utilized by the Near-RT RIC 127 and may be received at the SMO Framework 107 or the Non-RT RIC 117 from non-network data sources or from network functions. In some examples, the Non-RT RIC 117 or the Near-RT RIC 127 may be configured to tune RAN behavior or performance. For example, the Non-RT RIC 117 may monitor long-term trends and patterns for performance and employ AI/ML models to perform corrective actions through the SMO Framework 107 (such as reconfiguration via O1) or via creation of RAN management policies (such as A1 policies).

Figure 2:
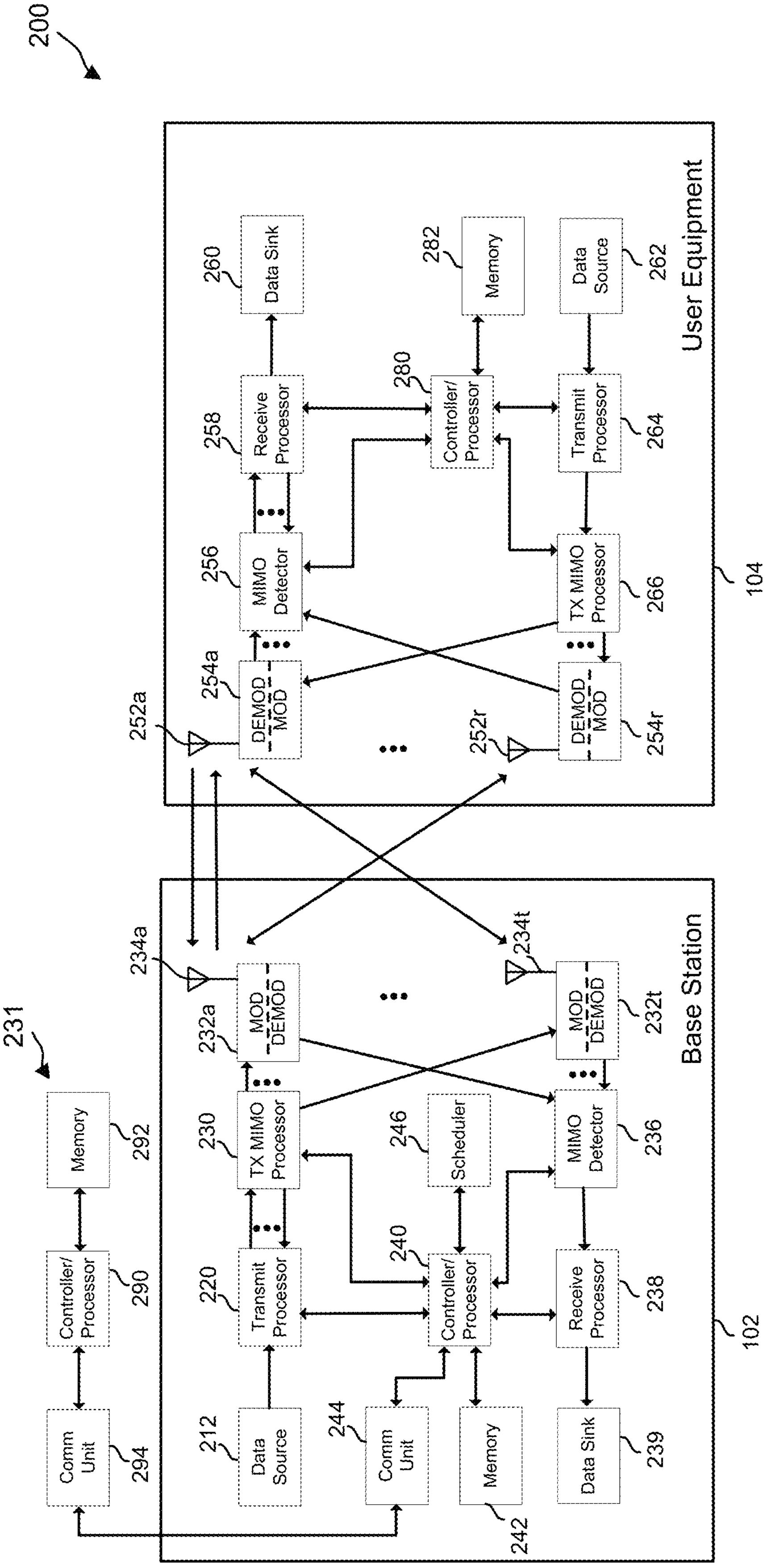
FIG. 2 is a diagram illustrating a design of a base station and a user equipment (UE) device that enable transmission and processing of signals exchanged between the UE and the base station, which may be employed by the disclosed systems and techniques for joint MIMO communications and MIMO sensing, in accordance with some aspects of the present disclosure.

FIG. 2 shows a block diagram of a design of a base station 102 and a UE 104 that enable transmission and processing of signals exchanged between the UE and the base station, which may be employed by the disclosed systems and techniques for joint MIMO communications and MIMO sensing, in accordance with some aspects of the present disclosure. Design 200 includes components of a base station 102 and a UE 104, which may be one of the base stations 102 and one of the UEs 104 in FIG. 1. Base station 102 may be equipped with T antennas 234*a* through 2347, and UE 104 may be equipped with R antennas 252*a* through 252*r*, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. The modulators 232*a* through 232*t* are shown as a combined modulator-demodulator (MOD-DEMOD). In some cases, the modulators and demodulators can be separate components. Each modulator of the modulators 232*a* to 232*t* may process a respective output symbol stream, e.g., for an orthogonal frequency-division multiplexing (OFDM) scheme and/or the like, to obtain an output sample stream. Each modulator of the modulators 232*a* to 232*t* may further process (e.g., convert to analog, amplify, filter, and upconvert) the output sample stream to obtain a downlink signal. T downlink signals may be transmitted from modulators 232*a* to 232*t* via T antennas 234*a* through 2347*t*, respectively. According to certain aspects described in more detail below, the synchronization signals can be generated with location encoding to convey additional information.

At UE 104, antennas 252*a* through 252*r* may receive the downlink signals from base station 102 and/or other base stations and may provide received signals to demodulators (DEMODs) 254*a* through 254*r*, respectively. The demodulators 254*a* through 254*r* are shown as a combined modulator-demodulator (MOD-DEMOD). In some cases, the modulators and demodulators can be separate components. Each demodulator of the demodulators 254*a* through 254*r* may condition (e.g., filter, amplify, downconvert, and digitize) a received signal to obtain input samples. Each demodulator of the demodulators 254*a* through 254*r* may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254*a* through 254*r* (e.g., for DFT-s-OFDM, CP-OFDM, and/or the like), and transmitted to base station 102. At base station 102, the uplink signals from UE 104 and other UEs may be received by antennas 234*a* through 234*t*, processed by demodulators 232*a* through 232*t*, detected by a MIMO detector 236 if applicable, and further processed by a receive processor 238 to obtain decoded data and control information sent by UE 104. Receive processor 238 may provide the decoded data to a data sink 239 and the decoded control information to controller (processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with joint MIMO communications and MIMO sensing.

Memories 242 and 282 may store data and program codes for the base station 102 and the UE 104, respectively. A scheduler 246 may schedule UEs for data transmission on the downlink, uplink, and/or sidelink.

In some implementations, the UE 104 may include a radar receiver that includes: means for determining a sensing measurement accuracy of the radar receiver based on one or more sensing measurements associated with at least one target; and means for transmitting, based on the sensing measurement accuracy, a message to a network entity, the message including an indication to modify an allocation of sensing resources associated with the radar receiver for communications data. In some examples, the means for determining can include controller/processor 280, memory 282, receive processor 258, transmit processor 264, any combination thereof, or any other component(s) of the UE 104. In some examples, the means for transmitting can include controller/processor 280, transmit processor 264, TX MIMO processor 266, DEMODs 254*a* through 254*r*, antennas 252*a* through 252*r*, any combination thereof, or any other component(s) of the UE 104.

In some implementations, the base station 102 may include: means for receiving a message from a radar receiver, the message including an indication to modify an allocation of sensing resources associated with the radar receiver for communications data; and means for determining, based on the message, at least a portion of the sensing resources for the communications data. In some examples, the means for receiving can include controller/processor 240, transmit processor 224, TX MIMO processor 236, DEMODs 232*a* through 232*t*, antennas 234*a* through 234*t*, the scheduler 246, any combination thereof, or any other component(s) of the base station 102. In some examples, the means for determining can include controller/processor 240, memory 242, receive processor 238, transmit processor 220, the scheduler 246, any combination thereof, or any other component(s) of the base station 102.

In some implementations, the base station 102 may include a means for receiving a resource allocation request from a second network entity for an allocation of sensing resources for communications data, and a means for transmitting a message to one or more radar devices, the message including information associated with an allocation of at least a portion of resources associated with the one or more radar devices for the communications data. In some examples, the means for receiving can include controller/processor 240, transmit processor 224, TX MIMO processor 236, DEMODs 232*a* through 232*t*, antennas 234*a* through 234*t*, the scheduler 246, any combination thereof, or any other component(s) of the base station 102. In some examples, the means for transmitting can include controller/processor 240, transmit processor 224, TX MIMO 236, DEMODs 232*a* through 232*t*, processor antennas 234*a* through 234*t*, the scheduler 246, any combination thereof, or any other component(s) of the base station 102.

Figure 3:
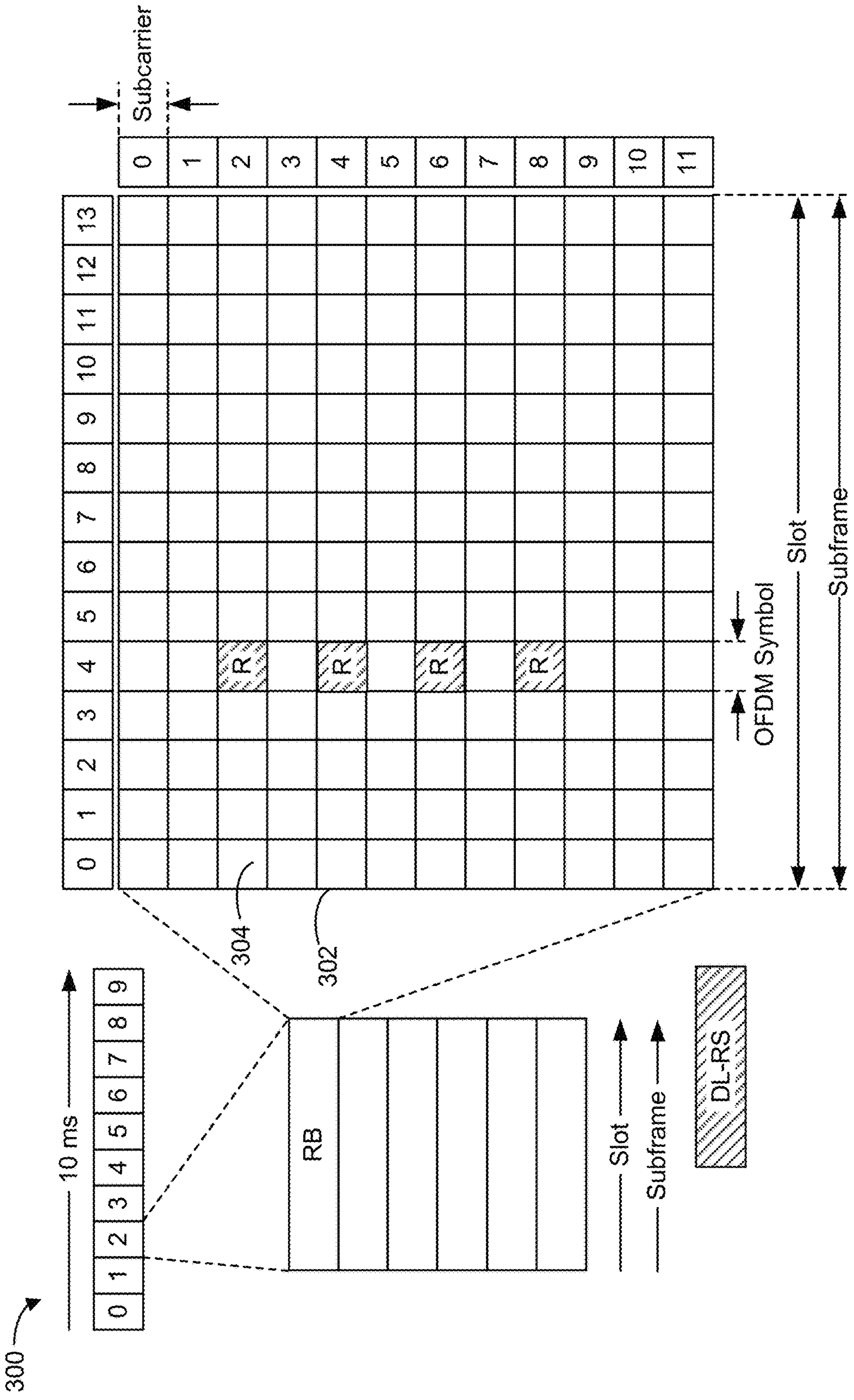
FIG. 3 is a diagram illustrating an example of a frame structure, which may be employed by the disclosed systems and techniques for joint MIMO communications and MIMO sensing, in accordance with some aspects of the present disclosure.

Various radio frame structures may be used to support downlink, uplink, and sidelink transmissions between network nodes (e.g., base stations and UEs). FIG. 3 is a diagram 300 illustrating an example of a frame structure, which may be employed by the disclosed systems and techniques for joint MIMO communications and MIMO sensing, according to some aspects of the disclosure. Other wireless communications technologies may have different frame structures and/or different channels.

NR (and LTE) utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal fast Fourier transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies (u). For example, subcarrier spacing (SCS) of 15 kHz, 30 kHz, 60 kHz, 120 kHz, and 240 kHz or greater may be available. Table 1 provided below lists some various parameters for different NR numerologies.

TABLE 1

| | SCS (kHz) | Symbols/ Sot | Slots/ Subframe | Slots/ Frame | Slot Duration (ms) | Symbol Duration (μs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In one example, a numerology of 15 kHz is used. Thus, in the time domain, a 10 millisecond (ms) frame is divided into 10 equally sized subframes of 1 ms each, and each subframe includes one time slot. In FIG. 3, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. FIG. 3 illustrates an example of a resource block (RB) 302, which may be employed by the disclosed systems and techniques for joint MIMO communications and MIMO sensing, in accordance with some aspects of the present disclosure. Data or information for joint MIMO communications and MIMO sensing may be included in one or more RBs 302. The RB 302 is arranged with the time domain on the horizontal (or x-)axis and the frequency domain on the vertical (or y-)axis. As shown, the RB 302 may be 180 kilohertz (kHz) wide in frequency and one slot long in time (with a slot being 1 milliseconds (ms) in time). In some cases, the slot may include fourteen symbols (e.g., in a slot configuration 0). The RB 302 includes twelve subcarriers (along the y-axis) and fourteen symbols (along the x-axis).

An intersection of a symbol and subcarrier can be referred to as a resource element (RE) 304 or tone. The RB 302 of FIG. 3 includes multiple REs, including the resource element (RE) 304. For instance, a RE 304 is 1 subcarrier×1 symbol (e.g., OFDM symbol), and is the smallest discrete part of the subframe. A RE 304 includes a single complex value representing data from a physical channel or signal. The number of bits carried by each RE 304 depends on the modulation scheme.

In some aspects, some REs 304 can be used to transmit downlink reference (pilot) signals (DL-RS). The DL-RS can include Positioning Reference Signal (PRS), Tracking Reference Signal (TRS), Phase Tracking Reference Signal (PTRS), Channel State Information Reference Signal (CSI-RS), Demodulation Reference Signal (DMRS), Primary Synchronization Signal (PSS), Secondary Synchronization Signal (SSS), etc. The resource grid if FIG. 3 illustrates exemplary locations of REs 304 used to transmit DL-RS (labeled "R").

Figure 4:
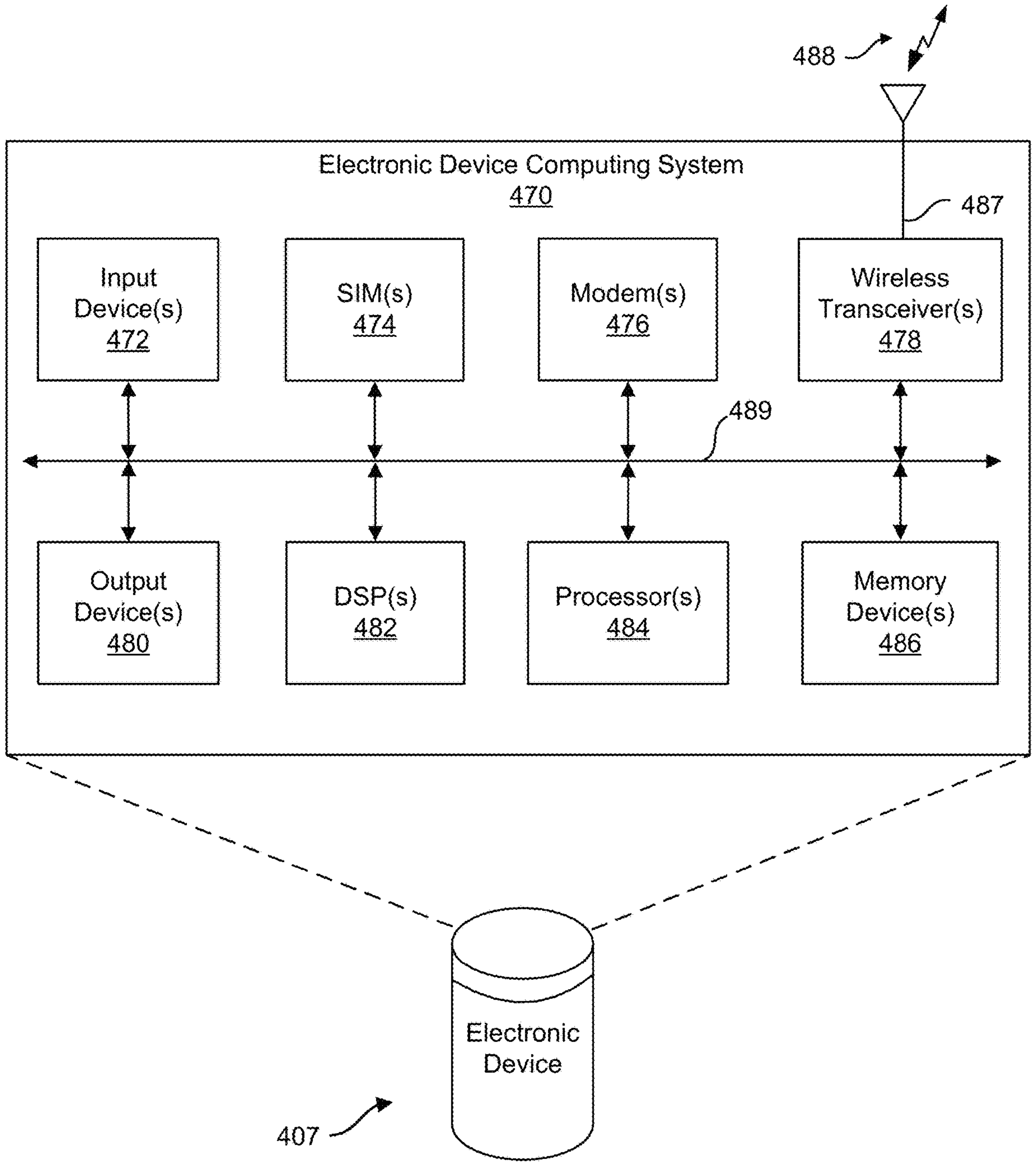
FIG. 4 is a block diagram illustrating an example of a computing system of an electronic device that may be employed by the disclosed systems and techniques for joint MIMO communications and MIMO sensing, in accordance with some aspects of the present disclosure.

FIG. 4 is a block diagram illustrating an example of a computing system 470 of an electronic device 407, which may be employed by the disclosed systems and techniques for joint MIMO communications and MIMO sensing, in accordance with some aspects of the present disclosure. The electronic device 407 is an example of a device that can include hardware and software for the purpose of connecting and exchanging data with other devices and systems using a communications network (e.g., a $3^{rd}$ Generation Partnership network, such as a $5^{th}$ Generation (5G)/New Radio (NR) network, a $4^{th}$ Generation (4G)/Long Term Evolution (LTE) network, a WiFi network, or other communications network). For example, the electronic device 407 can include, or be a part of, a mobile device (e.g., a mobile telephone), a wearable device (e.g., a network-connected or smart watch), an extended reality device (e.g., a virtual reality (VR) device, an augmented reality (AR) device, or a mixed reality (MR) device), a personal computer, a laptop computer, a tablet computer, an Internet-of-Things (IOT) device, a wireless access point, a router, a vehicle or component of a vehicle, a server computer, a robotics device, and/or other device used by a user to communicate over a wireless communications network. In some cases, the device 407 can be referred to as user equipment (UE), such as when referring to a device configured to communicate using 5G/NR, 4G/LTE, or other telecommunication standard. In some cases, the device can be referred to as a station (STA), such as when referring to a device configured to communicate using the Wi-Fi standard.

The computing system 470 includes software and hardware components that can be electrically or communicatively coupled via a bus 489 (or may otherwise be in communication, as appropriate). For example, the computing system 470 includes one or more processors 484. The one or more processors 484 can include one or more CPUs, ASICS, FPGAs, APs, GPUs, VPUs, NSPs, microcontrollers, dedicated hardware, any combination thereof, and/or other processing device/s and/or system/s. The bus 489 can be used by the one or more processors 484 to communicate between cores and/or with the one or more memory devices 486.

The computing system 470 may also include one or more memory devices 486, one or more digital signal processors (DSPs) 482, one or more subscriber identity modules (SIMs) 474, one or more modems 476, one or more wireless transceivers 478, one or more antennas 487, one or more input devices 472 (e.g., a camera, a mouse, a keyboard, a touch sensitive screen, a touch pad, a keypad, a microphone or a microphone array, and/or the like), and one or more output devices 480 (e.g., a display, a speaker, a printer, and/or the like).

The one or more wireless transceivers 478 can receive wireless signals (e.g., signal 488) via antenna 487 from one or more other devices, such as other user devices, network devices (e.g., base stations such as evolved Node Bs (eNBs) and/or gNodeBs (gNBs), WiFi access points (APs) such as routers, range extenders or the like, etc.), cloud networks, and/or the like. In some examples, the computing system 470 can include multiple antennas or an antenna array that can facilitate simultaneous transmit and receive functionality. Antenna 487 can be an omnidirectional antenna such that RF signals can be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 478 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 488 into a baseband or intermediate frequency and can convert the RF signals to the digital domain.

In some cases, the computing system 470 can include a coding-decoding device (or CODEC) configured to encode and/or decode data transmitted and/or received using the one or more wireless transceivers 478. In some cases, the computing system 470 can include an encryption-decryption device or component configured to encrypt and/or decrypt data (e.g., according to the Advanced Encryption Standard (AES) and/or Data Encryption Standard (DES) standard) transmitted and/or received by the one or more wireless transceivers 478.

The one or more SIMs 474 can each securely store an international mobile subscriber identity (IMSI) number and related key assigned to the user of the electronic device 407. The IMSI and key can be used to identify and authenticate the subscriber when accessing a network provided by a network service provider or operator associated with the one or more SIMs 474. The one or more modems 476 can modulate one or more signals to encode information for transmission using the one or more wireless transceivers 478. The one or more modems 476 can also demodulate signals received by the one or more wireless transceivers 478 in order to decode the transmitted information. In some examples, the one or more modems 476 can include a WiFi modem, a 4G (or LTE) modem, a 5G (or NR) modem, and/or other types of modems. The one or more modems 476 and the one or more wireless transceivers 478 can be used for communicating data for the one or more SIMs 474.

The computing system 470 can also include (and/or be in communication with) one or more non-transitory machine-readable storage media or storage devices (e.g., one or more memory devices 486), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 486 and executed by the one or more processor(s) 484 and/or the one or more DSPs 482. The computing system 470 can also include software elements (e.g., located within the one or more memory devices 486), including, for example, an operating system, device drivers, executable libraries, and/or other code, such as one or more application programs, which may comprise computer programs implementing the functions provided by various aspects, and/or may be designed to implement methods and/or configure systems, as described herein.

In some aspects, the electronic device 407 can include means for performing operations described herein. The means can include one or more of the components of the computing system 470. For example, the means for performing operations described herein may include one or more of input device(s) 472, SIM(s) 474, modems(s) 476, wireless transceiver(s) 478, output device(s) 480, DSP(s) 482, processors 484, memory device(s) 486, and/or antenna(s) 487.

In some aspects, the electronic device 407 can include means for providing joint MIMO communications and MIMO sensing. In some examples, any or all of these means can include the one or more wireless transceivers 478, the one or more modems 476, the one or more processors 484, the one or more DSPs 482, the one or more memory devices 486, any combination thereof, or other component(s) of the electronic device 407.

Figure 5:
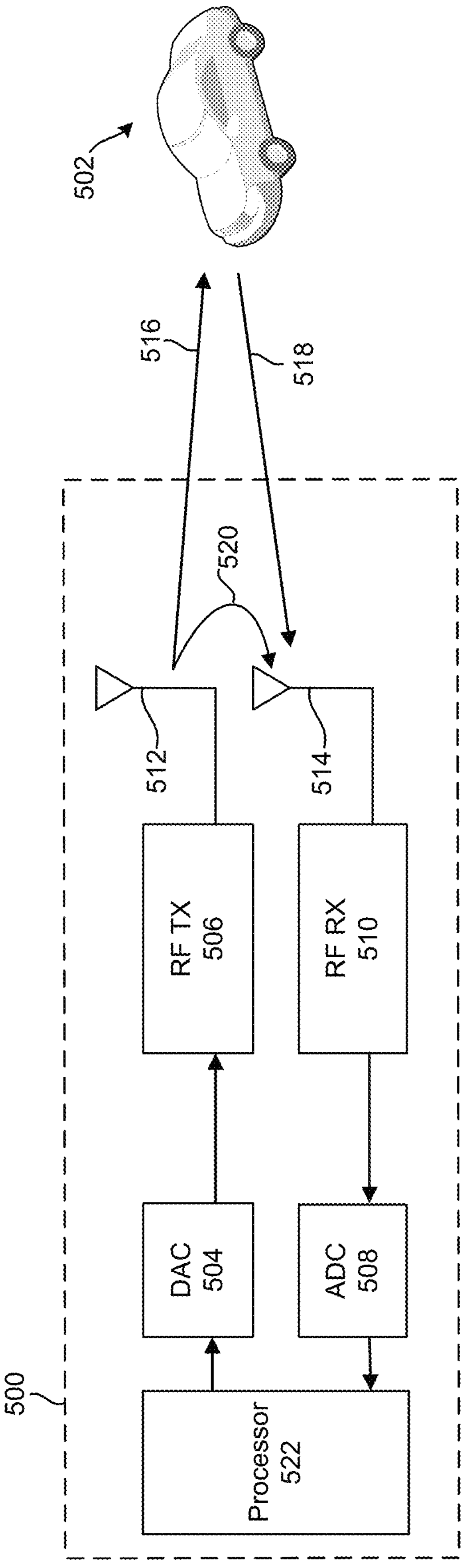
FIG. 5 is a diagram illustrating an example of a wireless device utilizing radio frequency (RF) monostatic sensing techniques, which may be employed by the disclosed systems and techniques for joint MIMO communications and MIMO sensing to determine one or more characteristics of a target object, in accordance with some aspects of the present disclosure.

FIG. 5 is a diagram illustrating an example of a wireless device 500 utilizing RF monostatic sensing techniques, which may be employed by the disclosed systems and techniques for joint MIMO communications and MIMO sensing, to determine one or more characteristics (e.g., location, speed or velocity, heading, etc.) of a target 502 object, in accordance with some aspects of the present disclosure. In particular, FIG. 5 is a diagram illustrating an example of a wireless device 500 (e.g., a transmit/receive sensing node) that utilizes RF sensing techniques (e.g., monostatic sensing) to perform one or more functions, such as detecting a presence and location of a target 502 (e.g., an object, user, or vehicle), which in this figure is illustrated in the form of a vehicle.

In some examples, the wireless device 500 can be a mobile phone, a tablet computer, a wearable device, a vehicle, an extending reality (XR) device, a computing device or component of a vehicle, or other device (e.g., device 407 of FIG. 4) that includes at least one RF interface. In some examples, the wireless device 500 can be a device that provides connectivity for a user device (e.g., for electronic device 407 of FIG. 4), such as a base station (e.g., a gNB, eNB, etc.), a wireless access point (AP), or other device that includes at least one RF interface.

In some aspects, wireless device 500 can include one or more components for transmitting an RF signal. The wireless device 500 can include at least one processor 522 for generating a digital signal or waveform. The wireless device 500 can also include a digital-to-analog converter (DAC) 504 that is capable of receiving the digital signal or waveform from the processor(s) 522 (e.g., a microprocessor), and converting the digital signal or waveform to an analog waveform. The analog signal that is the output of the DAC 504 can be provided to RF transmitter 506 for transmission. The RF transmitter 506 can be a Wi-Fi transmitter, a 5G/NR transmitter, a Bluetooth™ transmitter, or any other transmitter capable of transmitting an RF signal.

RF transmitter 506 can be coupled to one or more transmitting antennas such as Tx antenna 512. In some examples, transmit (Tx) antenna 512 can be an omnidirectional antenna that is capable of transmitting an RF signal in all directions. For example, Tx antenna 512 can be an omnidirectional Wi-Fi antenna that can radiate Wi-Fi signals (e.g., 2.4 GHz, 5 GHZ, 6 GHZ, etc.) in a 360-degree radiation pattern. In another example, Tx antenna 512 can be a directional antenna that transmits an RF signal in a particular direction.

In some examples, wireless device 500 can also include one or more components for receiving an RF signal. For example, the receiver lineup in wireless device 500 can include one or more receiving antennas such as a receive (Rx) antenna 514. In some examples, Rx antenna 514 can be an omnidirectional antenna capable of receiving RF signals from multiple directions. In other examples, Rx antenna 514 can be a directional antenna that is configured to receive signals from a particular direction. In further examples, the Tx antenna 512 and/or the Rx antenna 514 can include multiple antennas (e.g., elements) configured as an antenna array (e.g., a phase antenna array), which may be used for MIMO communications and/or sensing.

Wireless device 500 can also include an RF receiver 510 that is coupled to Rx antenna 514. RF receiver 510 can include one or more hardware components for receiving an RF waveform such as a Wi-Fi signal, a Bluetooth™ signal, a 5G/NR signal, or any other RF signal. The output of RF receiver 510 can be coupled to an analog-to-digital converter (ADC) 508. ADC 508 can be configured to convert the received analog RF waveform into a digital waveform. The digital waveform that is the output of the ADC 508 can be provided to the processor(s) 522 for processing. The processor(s) 522 (e.g., a digital signal processor (DSP)) can be configured for processing the digital waveform.

In one example, wireless device 500 can implement RF sensing techniques, for example monostatic sensing techniques, by causing a Tx waveform 516 to be transmitted from Tx antenna 512. Although Tx waveform 516 is illustrated as a single line, in some cases, Tx waveform 516 can be transmitted in all directions by an omnidirectional Tx antenna 512. In one example, Tx waveform 516 can be a Wi-Fi waveform that is transmitted by a Wi-Fi transmitter in wireless device 500. In some cases, Tx waveform 516 can correspond to a Wi-Fi waveform that is transmitted at or near the same time as a Wi-Fi data communication signal or a Wi-Fi control function signal (e.g., a beacon transmission). In some examples, Tx waveform 516 can be transmitted using the same or a similar frequency resource as a Wi-Fi data communication signal or a Wi-Fi control function signal (e.g., a beacon transmission). In some aspects, Tx waveform 516 can correspond to a Wi-Fi waveform that is transmitted separately from a Wi-Fi data communication signal and/or a Wi-Fi control signal (e.g., Tx waveform 516 can be transmitted at different times and/or using a different frequency resource).

In some examples, Tx waveform 516 can correspond to a 5G NR waveform that is transmitted at or near the same time as a 5G NR data communication signal or a 5G NR control function signal. In some examples, Tx waveform 516 can be transmitted using the same or a similar frequency resource as a 5G NR data communication signal or a 5G NR control function signal. In some aspects, Tx waveform 516 can correspond to a 5G NR waveform that is transmitted separately from a 5G NR data communication signal and/or a 5G NR control signal (e.g., Tx waveform 516 can be transmitted at different times and/or using a different frequency resource).

In some aspects, one or more parameters associated with Tx waveform 516 can be modified that may be used to increase or decrease RF sensing resolution. The parameters may include frequency, bandwidth, number of spatial streams, the number of antennas configured to transmit Tx waveform 516, the number of antennas configured to receive a reflected RF signal (e.g., Rx waveform 518) corresponding to Tx waveform 516, the number of spatial links (e.g., number of spatial streams multiplied by number of antennas configured to receive an RF signal), the sampling rate, or any combination thereof. The transmitted waveform (e.g., Tx waveform 516) and the received waveform (e.g., Rx waveform 518) can include one or more RF sensing signals, which are also referred to as radar reference signals (RSs).

In further examples, Tx waveform 516 can be implemented to have a sequence that has perfect or almost perfect autocorrelation properties. For instance, Tx waveform 516 can include single carrier Zadoff sequences or can include symbols that are similar to orthogonal frequency-division multiplexing (OFDM) Long Training Field (LTF) symbols. In some cases, Tx waveform 516 can include a chirp signal, as used, for example, in a Frequency-Modulated Continuous-Wave (FM-CW) radar system. In some configurations, the chirp signal can include a signal in which the signal frequency increases and/or decreases periodically in a linear and/or an exponential manner.

In some aspects, wireless device 500 can implement RF sensing techniques by performing alternating transmit and receive functions (e.g., performing a half-duplex operation). For example, wireless device 500 can alternately enable its RF transmitter 506 to transmit the Tx waveform 516 when the RF receiver 510 is not enabled to receive (i.e. not receiving), and enable its RF receiver 510 to receive the Rx waveform 518 when the RF transmitter 506 is not enabled to transmit (i.e. not transmitting). When the wireless device 500 is performing a half-duplex operation, the wireless device 500 may transmit Tx waveform 516, which may be a radar RS (e.g., sensing signal).

In other aspects, wireless device 500 can implement RF sensing techniques by performing concurrent transmit and receive functions (e.g., performing a sub-band or full-band full-duplex operation). For example, wireless device 500 can enable its RF receiver 510 to receive at or near the same time as it enables RF transmitter 506 to transmit Tx waveform 516. When the wireless device 500 is performing a full-duplex operation (e.g., either sub-band full-duplex or full-band full-duplex), the wireless device 500 may transmit Tx waveform 516, which may be a radar RS (e.g., sensing signal).

In some examples, transmission of a sequence or pattern that is included in Tx waveform 516 can be repeated continuously such that the sequence is transmitted a certain number of times or for a certain duration of time. In some examples, repeating a pattern in the transmission of Tx waveform 516 can be used to avoid missing the reception of any reflected signals if RF receiver 510 is enabled after RF transmitter 506. In one example implementation, Tx waveform 516 can include a sequence having a sequence length L that is transmitted two or more times, which can allow RF receiver 510 to be enabled at a time less than or equal to L in order to receive reflections corresponding to the entire sequence without missing any information.

By implementing alternating or simultaneous transmit and receive functionality (e.g. half-duplex or full-duplex operation), wireless device 500 can receive signals that correspond to Tx waveform 516. For example, wireless device 500 can receive signals that are reflected from objects or people that are within range of Tx waveform 516, such as Rx waveform 518 reflected from target 502. Wireless device 500 can also receive leakage signals (e.g., Tx leakage signal 520) that are coupled directly from Tx antenna 512 to Rx antenna 514 without reflecting from any objects. For example, leakage signals can include signals that are transferred from a transmitter antenna (e.g., Tx antenna 512) on a wireless device to a receive antenna (e.g., Rx antenna 514) on the wireless device without reflecting from any objects. In some cases, Rx waveform 518 can include multiple sequences that correspond to multiple copies of a sequence that are included in Tx waveform 516. In some examples, wireless device 500 can combine the multiple sequences that are received by RF receiver 510 to improve the signal to noise ratio (SNR).

Wireless device 500 can further implement RF sensing techniques by obtaining RF sensing data associated with each of the received signals corresponding to Tx waveform 516. In some examples, the RF sensing data can include channel state information (CSI) data relating to the direct paths (e.g., leakage signal 520) of Tx waveform 516 together with data relating to the reflected paths (e.g., Rx waveform 518) that correspond to Tx waveform 516.

In some aspects, RF sensing data (e.g., CSI data) can include information that can be used to determine the manner in which an RF signal (e.g., Tx waveform 516) propagates from RF transmitter 506 to RF receiver 510. RF sensing data can include data that corresponds to the effects on the transmitted RF signal due to scattering, fading, and/or power decay with distance, or any combination thereof. In some examples, RF sensing data can include imaginary data and real data (e.g., I/Q components) corresponding to each tone in the frequency domain over a particular bandwidth.

In some examples, RF sensing data can be used by the processor(s) 522 to calculate distances and angles of arrival that correspond to reflected waveforms, such as Rx waveform 518. In further examples, RF sensing data can also be used to detect motion, determine location, detect changes in location or motion patterns, or any combination thereof. In some cases, the distance and angle of arrival of the reflected signals can be used to identify the size, position, movement, and/or orientation of targets (e.g., target 502) in the surrounding environment in order to detect target presence/proximity.

The processor(s) 522 of the wireless device 500 can calculate distances and angles of arrival corresponding to reflected waveforms (e.g., the distance and angle of arrival corresponding to Rx waveform 518) by utilizing signal processing, machine learning algorithms, any other suitable technique, or any combination thereof. In other examples, wireless device 500 can transmit or send the RF sensing data to at least one processor of another computing device, such as a server or base station, that can perform the calculations to obtain the distance and angle of arrival corresponding to Rx waveform 518 or other reflected waveforms.

In one example, the distance of Rx waveform 518 can be calculated by measuring the difference in time from reception of the leakage signal to the reception of the reflected signals. For example, wireless device 500 can determine a baseline distance of zero that is based on the difference from the time the wireless device 500 transmits Tx waveform 516 to the time it receives leakage signal 520 (e.g., propagation delay). The processor(s) 522 of the wireless device 500 can then determine a distance associated with Rx waveform 518 based on the difference from the time the wireless device 500 transmits Tx waveform 516 to the time it receives Rx waveform 518 (e.g., time of flight, which is also referred to as round trip time (RTT)), which can then be adjusted according to the propagation delay associated with leakage signal 520. In doing so, the processor(s) 522 of the wireless device 500 can determine the distance traveled by Rx waveform 518 which can be used to determine the presence and movement of a target (e.g., target 502) that caused the reflection.

In further examples, the angle of arrival of Rx waveform 518 can be calculated by the processor(s) 522 by measuring the time difference of arrival of Rx waveform 518 between individual elements of a receive antenna array, such as antenna 514. In some examples, the time difference of arrival can be calculated by measuring the difference in received phase at each element in the receive antenna array.

In some cases, the distance and the angle of arrival of Rx waveform 518 can be used by processor(s) 522 to determine the distance between wireless device 500 and target 502 as well as the position of the target 502 relative to the wireless device 500. The distance and the angle of arrival of Rx waveform 518 can also be used to determine presence, movement, proximity, identity, or any combination thereof, of target 502. For example, the processor(s) 522 of the wireless device 500 can utilize the calculated distance and angle of arrival corresponding to Rx waveform 518 to determine that the target 502 is moving towards wireless device 500.

As noted above, wireless device 500 can include mobile devices (e.g., IoT devices, smartphones, laptops, tablets, etc.) or other types of devices. In some examples, wireless device 500 can be configured to obtain device location data and device orientation data together with the RF sensing data. In some instances, device location data and device orientation data can be used to determine or adjust the distance and angle of arrival of a reflected signal such as Rx waveform 518. For example, wireless device 500 may be set on the ground facing the sky as a target 502 (e.g., a vehicle) moves towards it during the RF sensing process. In this instance, wireless device 500 can use its location data and orientation data together with the RF sensing data to determine the direction that the target 502 is moving.

In some examples, device position data can be gathered by wireless device 500 using techniques that include RTT measurements, time of arrival (TOA) measurements, time difference of arrival (TDOA) measurements, passive positioning measurements, angle of arrival (AOA) measurements, angle of departure (AoD) measurements, received signal strength indicator (RSSI) measurements, CSI data, using any other suitable technique, or any combination thereof. In further examples, device orientation data can be obtained from electronic sensors on the wireless device 500, such as a gyroscope, an accelerometer, a compass, a magnetometer, a barometer, any other suitable sensor, or any combination thereof.

Figure 6:
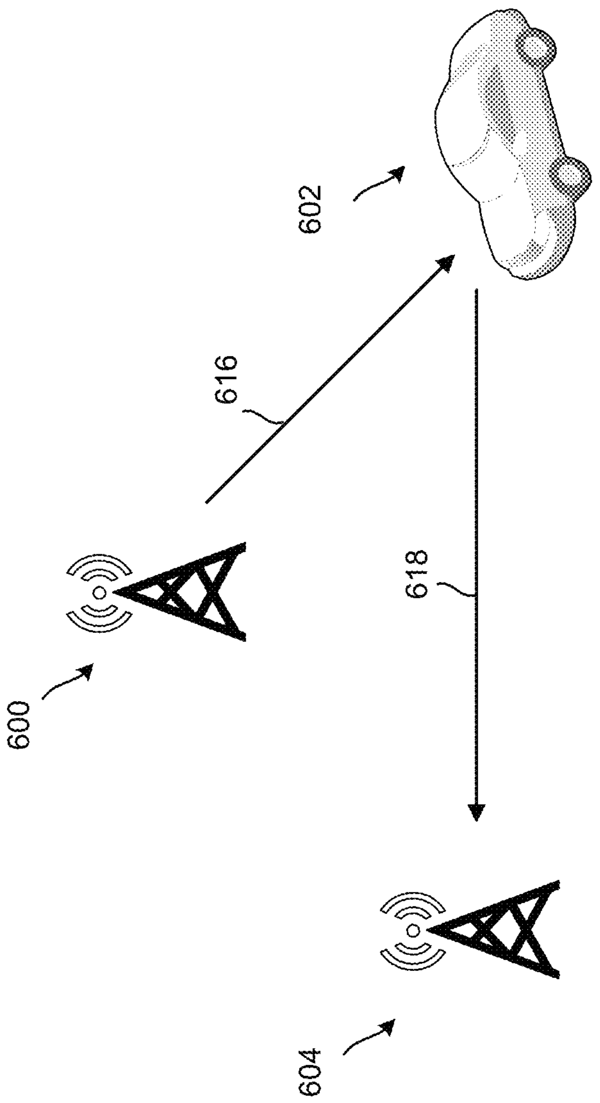
FIG. 6 is a diagram illustrating an example of a receiver utilizing RF bistatic sensing techniques with one transmitter, which may be employed by the disclosed systems and techniques for joint MIMO communications and MIMO sensing to determine one or more characteristics of a target object, in accordance with some aspects of the present disclosure.

FIG. 6 is a diagram illustrating an example of a receiver 604 utilizing RF bistatic sensing techniques with one transmitter 600, which may be employed by the disclosed systems and techniques for joint MIMO communications and MIMO sensing, to determine one or more characteristics (e.g., location, speed or velocity, heading, etc.) of a target 602 object, in accordance with some aspects of the present disclosure. For example, the receiver 604 can use the RF bistatic sensing to detect a presence and location of a target 602 (e.g., an object, user, or vehicle), which is illustrated in the form of a vehicle in FIG. 6. In one example, the receiver 604 may be in the form of a base station, such as a gNB.

The bistatic radar system of FIG. 6 includes a transmitter 600 (e.g., a transmit sensing node), which in this figure is depicted to be in the form of a base station (e.g., gNB), and a receiver 604 (e.g., a receive sensing node) that are separated by a distance comparable to the expected target distance. As compared to the monostatic system of FIG. 5, the transmitter 600 and the receiver 604 of the bistatic radar system of FIG. 6 are located remote from one another. Conversely, monostatic radar is a radar system (e.g., the system of FIG. 5) comprising a transmitter (e.g., the RF transmitter 506 of wireless device 500 of FIG. 5) and a receiver (e.g., the RF receiver 510 of wireless device 500 of FIG. 5) that are co-located with one another.

An advantage of bistatic radar (or more generally, multistatic radar, which has more than one receiver) over monostatic radar is the ability to collect radar returns reflected from a scene at angles different than that of a transmitted pulse. This can be of interest to some applications (e.g., vehicle applications, scenes with multiple objects, military applications, etc.) where targets may reflect the transmitted energy in many directions (e.g., where targets are specifically designed to reflect in many directions), which can minimize the energy that is reflected back to the transmitter. It should be noted that, in one or more examples, a monostatic system can coexist with a multistatic radar system, such as when the transmitter also has a co-located receiver.

In some examples, the transmitter 600 and/or the receiver 604 of FIG. 6 can be a mobile phone, a tablet computer, a wearable device, a vehicle, or other device (e.g., device 407 of FIG. 4) that includes at least one RF interface. In some examples, the transmitter 600 and/or the receiver 604 can be a device that provides connectivity for a user device (e.g., for IoT device 407 of FIG. 4), such as a base station (e.g., a gNB, eNB, etc.), a wireless access point (AP), or other device that includes at least one RF interface.

In some aspects, transmitter 600 can include one or more components for transmitting an RF signal. The transmitter 600 can include at least one processor (e.g., the at least one processor 522 of FIG. 5) that is capable of determining signals (e.g., determining the waveforms for the signals) to be transmitted. The transmitter 600 can also include an RF transmitter (e.g., the RF transmitter 506 of FIG. 5) for transmission of a Tx signal comprising Tx waveform 616. The RF transmitter can be a transmitter configured to transmit cellular or telecommunication signals (e.g., a transmitter configured to transmit 5G/NR signals, 4G/LTE signals, or other cellular/telecommunication signals, etc.), a Wi-Fi transmitter, a Bluetooth™ transmitter, any combination thereof, or any other transmitter capable of transmitting an RF signal.

The RF transmitter can be coupled to one or more transmitting antennas, such as a Tx antenna (e.g., the TX antenna 512 of FIG. 5). In some examples, a Tx antenna can be an omnidirectional antenna that is capable of transmitting an RF signal in all directions, or a directional antenna that transmits an RF signal in a particular direction. In some examples, the Tx antenna may include multiple antennas (e.g., elements) configured as an antenna array.

The receiver 604 can include one or more components for receiving an RF signal. For example, the receiver 604 may include one or more receiving antennas, such as an Rx antenna (e.g., the Rx antenna 514 of FIG. 5). In some examples, an Rx antenna can be an omnidirectional antenna capable of receiving RF signals from multiple directions, or a directional antenna that is configured to receive signals from a particular direction. In further examples, the Rx antenna can include multiple antennas (e.g., elements) configured as an antenna array.

The receiver 604 may also include an RF receiver (e.g., RF receiver 510 of FIG. 5) coupled to the Rx antenna. The RF receiver may include one or more hardware components for receiving an RF waveform such as a Wi-Fi signal, a Bluetooth™ signal, a 5G/NR signal, or any other RF signal. The output of the RF receiver can be coupled to at least one processor (e.g., the at least one processor 522 of FIG. 5). The processor(s) may be configured to process a received waveform (e.g., Rx waveform 618).

In one or more examples, transmitter 600 can implement RF sensing techniques, for example bistatic sensing techniques, by causing a Tx waveform 616 to be transmitted from a Tx antenna. It should be noted that although the Tx waveform 616 is illustrated as a single line, in some cases, the Tx waveform 616 can be transmitted in all directions by an omnidirectional Tx antenna.

In one or more aspects, one or more parameters associated with the Tx waveform 616 may be used to increase or decrease RF sensing resolution. The parameters may include frequency, bandwidth, number of spatial streams, the number of antennas configured to transmit Tx waveform 616, the number of antennas configured to receive a reflected RF signal (e.g., Rx waveform 618) corresponding to the Tx waveform 616, the number of spatial links (e.g., number of spatial streams multiplied by number of antennas configured to receive an RF signal), the sampling rate, or any combination thereof. The transmitted waveform (e.g., Tx waveform 616) and the received waveform (e.g., the Rx waveform 618) can include one or more radar RF sensing signals (also referred to as RF sensing RSs).

During operation, the receiver 604 (e.g., which operates as a receive sensing node) can receive signals that correspond to Tx waveform 616, which is transmitted by the transmitter 600 (e.g., which operates as a transmit sensing node). For example, the receiver 604 can receive signals that are reflected from objects or people that are within range of the Tx waveform 616, such as Rx waveform 618 reflected from target 602. In some cases, the Rx waveform 618 can include multiple sequences that correspond to multiple copies of a sequence that are included in the Tx waveform 616. In some examples, the receiver 604 may combine the multiple sequences that are received to improve the SNR.

In some examples, RF sensing data can be used by at least one processor within the receiver 604 to calculate distances, angles of arrival, or other characteristics that correspond to reflected waveforms, such as the Rx waveform 618. In other examples, RF sensing data can also be used to detect motion, determine location, detect changes in location or motion patterns, or any combination thereof. In some cases, the distance and angle of arrival of the reflected signals can be used to identify the size, position, movement, and/or orientation of targets (e.g., target 602) in the surrounding environment in order to detect target presence/proximity.

The processor(s) of the receiver 604 can calculate distances and angles of arrival corresponding to reflected waveforms (e.g., the distance and angle of arrival corresponding to the Rx waveform 618) by using signal processing, machine learning algorithms, any other suitable technique, or any combination thereof. In other examples, the receiver 604 can transmit or send the RF sensing data to at least one processor of another computing device, such as a server, that can perform the calculations to obtain the distance and angle of arrival corresponding to the Rx waveform 618 or other reflected waveforms.

In one or more examples, the angle of arrival of the Rx waveform 618 can be calculated by a processor(s) of the receiver 604 by measuring the time difference of arrival of the Rx waveform 618 between individual elements of a receive antenna array of the receiver 604. In some examples, the time difference of arrival can be calculated by measuring the difference in received phase at each element in the receive antenna array.

In some cases, the distance and the angle of arrival of the Rx waveform 618 can be used by the processor(s) of the receiver 604 to determine the distance between the receiver 604 and the target 602 as well as the position of target 602 relative to the receiver 604. The distance and the angle of arrival of the Rx waveform 618 can also be used to determine presence, movement, proximity, identity, or any combination thereof, of the target 602. For example, the processor(s) of the receiver 604 may use the calculated distance and angle of arrival corresponding to the Rx waveform 618 to determine that the target 602 is moving towards the receiver 604.

Figure 7:
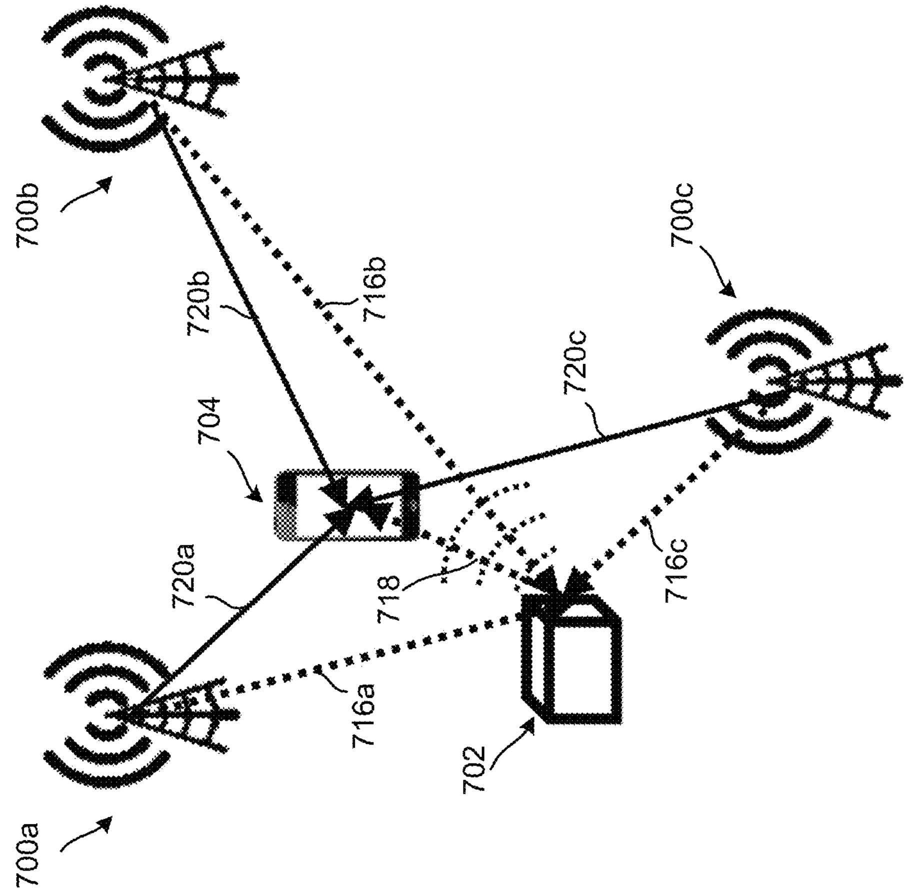
FIG. 7 is a diagram illustrating an example of a receiver utilizing RF bistatic sensing techniques with multiple transmitters, which may be employed by the disclosed systems and techniques for joint MIMO communications and MIMO sensing to determine one or more characteristics of a target object, in accordance with some aspects of the present disclosure.

FIG. 7 is a diagram illustrating an example of a receiver 704, in the form of a smart phone, utilizing RF bistatic sensing techniques with multiple transmitters (including a transmitter 700*a*, a transmitter 700*b*, and a transmitter 700*c*), which may be employed by the disclosed systems and techniques for joint MIMO communications and MIMO sensing, to determine one or more characteristics (e.g., location, velocity or speed, heading, etc.) of a target 702 object, in accordance with some aspects of the present disclosure. For example, the receiver 704 may use RF bistatic sensing to detect a presence and location of a target 702 (e.g., an object, user, or vehicle). The target 702 is depicted in FIG. 7 in the form of an object that does not have communications capabilities (which can be referred to as a device-free object), such as a person, a vehicle (e.g., a vehicle without the ability to transmit and receive messages, such as using C-V2X or DSRC protocols), or other device-free object. The bistatic radar system of FIG. 7 is similar to the bistatic radar system of FIG. 6, except that the bistatic radar system of FIG. 7 has multiple transmitters 700*a*, 700*b*, 700*c*, while the bistatic radar system of FIG. 6 has only one transmitter 600.

The bistatic radar system of FIG. 7 includes multiple transmitters 700*a*, 700*b*, 700*c* (e.g., transmit sensing nodes), which are illustrated to be in the form of base stations. The bistatic radar system of FIG. 7 also includes a receiver 704 (e.g., a receive sensing node), which is depicted in the form of a smart phone. The each of the transmitters 700*a*, 700*b*, 700*c* is separated from the receiver 704 by a distance comparable to the expected distance from the target 702. Similar to the bistatic system of FIG. 6, the transmitters 700*a*, 700*b*, 700*c* and the receiver 704 of the bistatic radar system of FIG. 7 are located remote from one another.

In one or more examples, the transmitters 700*a*, 700*b*, 700*c* and/or the receiver 704 may each be a mobile phone, a tablet computer, a wearable device, a vehicle (e.g., a vehicle configured to transmit and receive communications according to C-V2X, DSRC, or other communication protocol), or other device (e.g., device 407 of FIG. 4) that includes at least one RF interface. In some examples, the transmitters 700*a*, 700*b*, 700*c* and/or the receiver 704 may each be a device that provides connectivity for a user device (e.g., for IoT device 407 of FIG. 4), such as a base station (e.g., a gNB, eNB, etc.), a wireless access point (AP), or other device that includes at least one RF interface.

The transmitters 700*a*, 700*b*, 700*c* may include one or more components for transmitting an RF signal. Each of the transmitters 700*a*, 700*b*, 700*c* may include at least one processor (e.g., the processor(s) 522 of FIG. 5) that is capable of determining signals (e.g., determining the waveforms for the signals) to be transmitted. Each of the transmitters 700*a*, 700*b*, 700*c* can also include an RF transmitter (e.g., the RF transmitter 506 of FIG. 5) for transmission of Tx signals comprising Tx waveforms 716*a*, 716*b*, 716*c*, 720*a*, 720*b*, 720*c*. In one or more examples, Tx waveforms 716*a*, 716*b*, 716*c* are RF sensing signals, and Tx waveforms 720*a*, 720*b*, 720*c* are communications signals. In one or more examples, the Tx waveforms 720*a*, 720*b*, 720*c* are communications signals that may be used for scheduling transmitters (e.g., transmitters 700*a*, 700*b*, 700*c*) and receivers (e.g., receiver 704) for performing RF sensing of a target (e.g., target 702) to obtain location information regarding the target. The RF transmitter can be a transmitter configured to transmit cellular or telecommunication signals (e.g., a transmitter configured to transmit 5G/NR signals, 4G/LTE signals, or other cellular/telecommunication signals, etc.), a Wi-Fi transmitter, a Bluetooth™ transmitter, any combination thereof, or any other transmitter capable of transmitting an RF signal.

The RF transmitter may be coupled to one or more transmitting antennas, such as a Tx antenna (e.g., the TX antenna 512 of FIG. 5). In one or more examples, a Tx antenna can be an omnidirectional antenna that is capable of transmitting an RF signal in all directions, or a directional antenna that transmits an RF signal in a particular direction. The Tx antenna may include multiple antennas (e.g., elements) configured as an antenna array.

The receiver 704 of FIG. 7 may include one or more components for receiving an RF signal. For example, the receiver 704 can include one or more receiving antennas, such as an Rx antenna (e.g., the Rx antenna 514 of FIG. 5). In one or more examples, an Rx antenna can be an omnidirectional antenna capable of receiving RF signals from multiple directions, or a directional antenna that is configured to receive signals from a particular direction. In some examples, the Rx antenna may include multiple antennas (e.g., elements) configured as an antenna array (e.g., a phase antenna array), which may be used for MIMO communications and/or sensing.

The receiver 704 can also include an RF receiver (e.g., RF receiver 510 of FIG. 5) coupled to the Rx antenna. The RF receiver may include one or more hardware components for receiving an RF waveform such as a Wi-Fi signal, a Bluetooth™ signal, a 5G/NR signal, or any other RF signal. The output of the RF receiver can be coupled to at least one processor (e.g., the processor(s) 522 of FIG. 5). The processor(s) may be configured to process a received waveform (e.g., Rx waveform 718, which is a reflection (echo) RF sensing signal).

In some examples, the transmitters 700*a*, 700*b*, 700*c* can implement RF sensing techniques, for example bistatic sensing techniques, by causing Tx waveforms 716*a*, 716*b*, 716*c* (e.g., radar sensing signals) to be transmitted from a Tx antenna associated with each of the transmitters 700*a*, 700*b*, 700*c*. Although the Tx waveforms 716*a*, 716*b*, 716*c* are illustrated as single lines, in some cases, the Tx waveforms 716*a*, 716*b*, 716*c* may be transmitted in all directions (e.g., by an omnidirectional Tx antenna associated with each of the transmitters 700*a*, 700*b*, 700*c*).

In one or more aspects, one or more parameters associated with the Tx waveforms 716*a*, 716*b*, 716*c* may be used to increase or decrease RF sensing resolution. The parameters can include, but are not limited to, frequency, bandwidth, number of spatial streams, the number of antennas configured to transmit Tx waveforms 716*a*, 716*b*, 716*c*, the number of antennas configured to receive a reflected (echo) RF signal (e.g., Rx waveform 718) corresponding to each of the Tx waveforms 716*a*, 716*b*, 716*c*, the number of spatial links (e.g., number of spatial streams multiplied by number of antennas configured to receive an RF signal), the sampling rate, or any combination thereof. The transmitted waveforms (e.g., Tx waveforms 716*a*, 716*b*, 716*c*) and the received waveforms (e.g., the Rx waveform 718) may include one or more radar RF sensing signals (also referred to as RF sensing RSs). It should be noted that although only one reflected sensing signal (e.g., Rx waveform 718) is shown in FIG. 7, it is understood that a separate reflection (echo) sensing signal will be generated by each sensing signal (e.g., Tx waveforms 716*a*, 716*b*, 716*c*) reflecting off of the target 702.

During operation of the system of FIG. 7, the receiver 704 (e.g., which operates as a receive sensing node) can receive signals that correspond to Tx waveforms 716*a*, 716*b*, 716*c*, which are transmitted by the transmitters 700*a*, 700*b*, 700*c* (e.g., which each operate as a transmit sensing node). The receiver 704 can receive signals that are reflected from objects or people that are within range of the Tx waveforms 716*a*, 716*b*, 716*c*, such as Rx waveform 718 reflected from the target 702. In one or more examples, the Rx waveform 718 may include multiple sequences that correspond to multiple copies of a sequence that are included in its corresponding Tx waveform 716*a*, 716*b*, 716*c*. In some examples, the receiver 704 may combine the multiple sequences that are received to improve the SNR.

In some examples, RF sensing data can be used by at least one processor within the receiver 704 to calculate distances, angles of arrival (AOA), TDOA, angle of departure (AoD), or other characteristics that correspond to reflected waveforms (e.g., Rx waveform 718). In further examples, RF sensing data can also be used to detect motion, determine location, detect changes in location or motion patterns, or any combination thereof. In one or more examples, the distance and angle of arrival of the reflected signals can be used to identify the size, position, movement, and/or orientation of targets (e.g., target 702) in order to detect target presence/proximity.

The processor(s) of the receiver 704 can calculate distances and angles of arrival corresponding to reflected waveforms (e.g., the distance and angle of arrival corresponding to the Rx waveform 718) by using signal processing, machine learning algorithms, any other suitable technique, or any combination thereof. In one or more examples, the receiver 704 can transmit or send the RF sensing data to at least one processor of another computing device, such as a server, that can perform the calculations to obtain the distance and angle of arrival corresponding to the Rx waveform 718 or other reflected waveforms (not shown).

In one or more examples, a processor(s) of the receiver 704 can calculate the angle of arrival (AOA) of the Rx waveform 718 by measuring the TDOA of the Rx waveform 718 between individual elements of a receive antenna array of the receiver 704. In some examples, the TDOA can be calculated by measuring the difference in received phase at each element in the receive antenna array. In one illustrative example, to determine TDOA, the processor(s) can determine the difference time of arrival of the Rx waveform 718 to the receive antenna array elements, using one of them as a reference. The time difference is proportional to distance differences.

In some cases, the processor(s) of the receiver 704 can use the distance, the AOA, the TDOA, other measured information (e.g., AoD, etc.), any combination thereof, of the Rx waveform 718 to determine the distance between the receiver 704 and the target 702, and determine the position of target 702 relative to the receiver 704. In one example, the processor(s) can apply a multilateration or other location-based algorithm using the distance, AOA, and/or TDOA information as input to determine a position (e.g., 3D position) of the target 702. In other examples, the processor(s) can use the distance, the AOA, and/or the TDOA of the Rx waveform 718 to determine a presence, movement (e.g., velocity or speed, heading or direction or movement, etc.), proximity, identity, any combination thereof, or other characteristic of the target 702. For instance, the processor(s) of the receiver 704 may use the distance, the AOA, and/or the TDOA corresponding to the Rx waveform 718 to determine that the target is moving towards the receiver 704.

Figure 8:
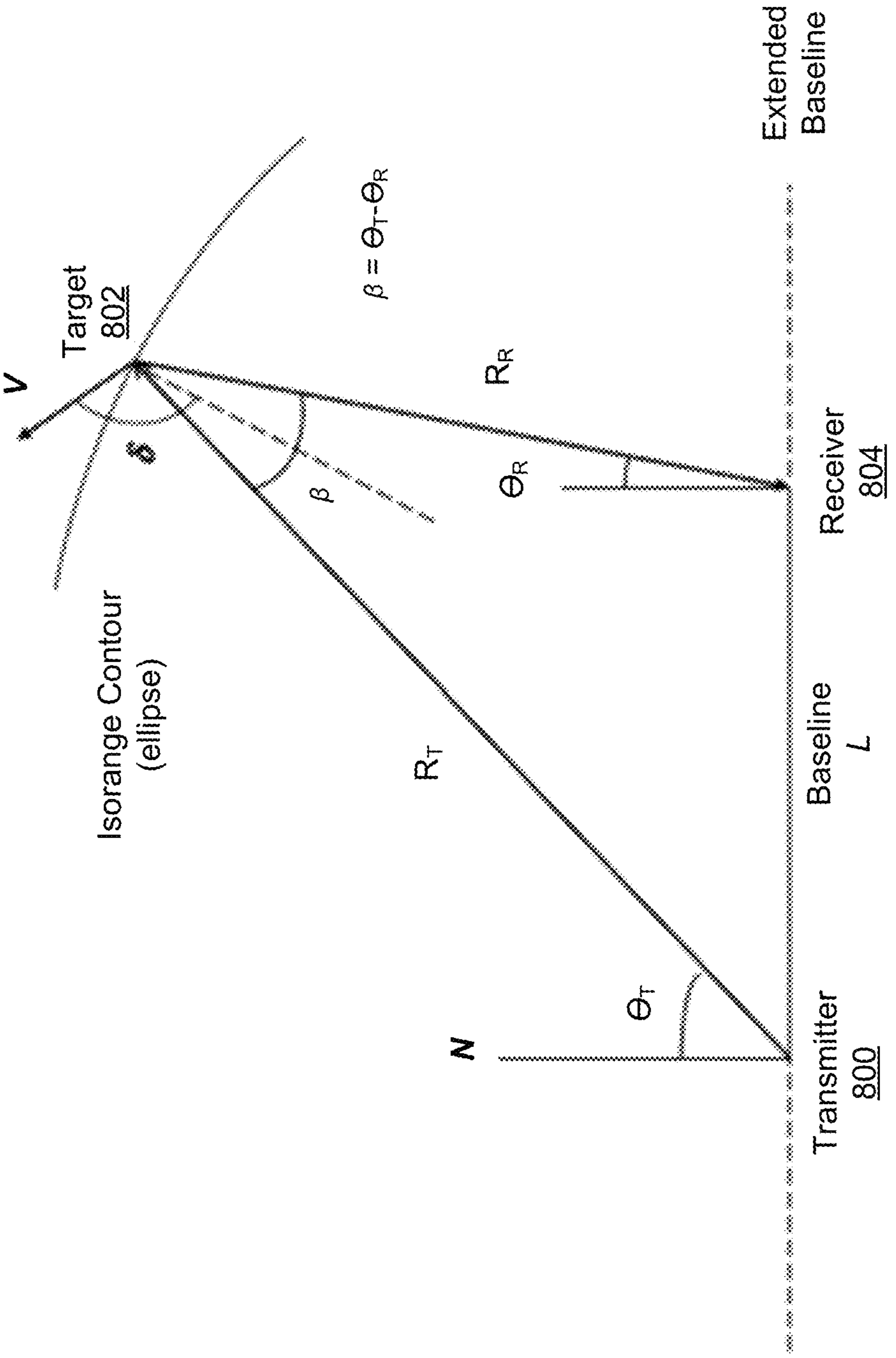
FIG. 8 is a diagram illustrating an example geometry for bistatic (or monostatic) sensing, in accordance with some aspects of the present disclosure.

FIG. 8 is a diagram illustrating geometry for bistatic (or monostatic) sensing, in accordance with some aspects of the present disclosure. FIG. 8 shows a bistatic radar North-reference coordinate system in two-dimensions. In particular, FIG. 8 shows a coordinate system and parameters defining bistatic radar operation in a plane (referred to as a bistatic plane) containing a transmitter 800, a receiver 804, and a target 802. A bistatic triangle lies in the bistatic plane. The transmitter 800, the target 802, and the receiver 804 are shown in relation to one another. The transmitter 800 and the receiver 804 are separated by a baseline distance L. The extended baseline is defined as continuing the baseline distance L beyond either the transmitter 800 or the receiver 804. The target 802 and the transmitter 800 are separated by a distance $R_T$, and the target 802 and the receiver 804 are separated by a distance $R_R$.

Angles $\theta_T$ and $\theta_R$ are, respectively, the transmitter 800 and receiver 804 look angles, which are taken as positive when measured clockwise from North (N). The angles $\theta_T$ and $\theta_R$ are also referred to as angles of arrival (AOA) or lines of sight (LOS). A bistatic angle (θ) is the angle subtended between the transmitter 800, the target 802, and the receiver 804 in the radar. In particular, the bistatic angle is the angle between the transmitter 800 and the receiver 804 with the vertex located at the target 802. The bistatic angle is equal to the transmitter 800 look angle minus the receiver 804 look angle $\theta_R$ (e.g., $\beta=\theta_T-\theta_R$).

When the bistatic angle is exactly zero (0), the radar is considered to be a monostatic radar; when the bistatic angle is close to zero, the radar is considered to be pseudo-monostatic; and when the bistatic angle is close to 180 degrees, the radar is considered to be a forward scatter radar. Otherwise, the radar is simply considered to be, and referred to as, a bistatic radar. The bistatic angle (β) can be used in determining the radar cross section of the target.

Figure 9:
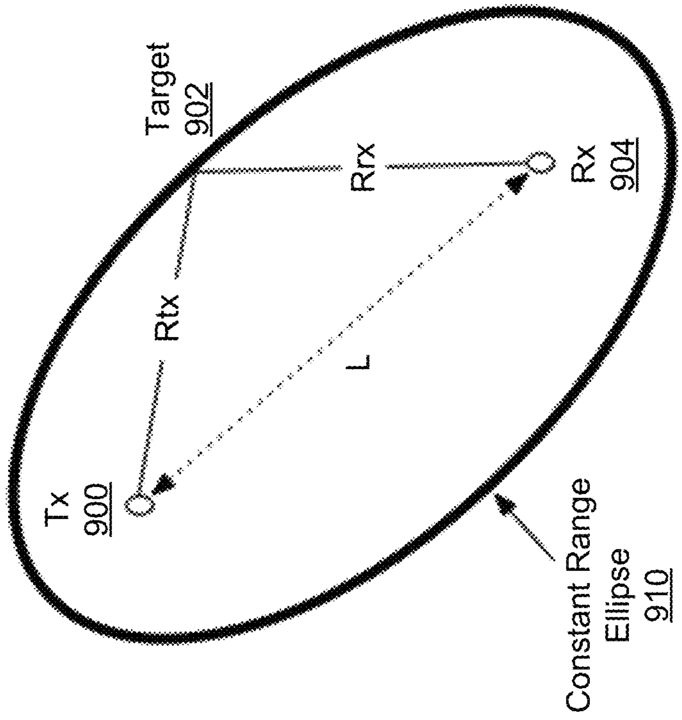
FIG. 9 is a diagram illustrating a bistatic range of bistatic sensing, in accordance with some aspects of the present disclosure.

FIG. 9 is a diagram illustrating an example of a bistatic range 910 of bistatic sensing, in accordance with some aspects of the present disclosure. In this figure, a transmitter (Tx) 900, a target 902, and a receiver (Rx) 904 of a radar are shown in relation to one another. The transmitter 900 and the receiver 904 are separated by a baseline distance L, the target 902 and the transmitter 900 are separated by a distance Rtx, and the target 902 and the receiver 904 are separated by a distance Rrx.

Bistatic range 910 (shown as an ellipse) refers to the measurement range made by radar with a separate transmitter 900 and receiver 904 (e.g., the transmitter 900 and the receiver 904 are located remote from one another). The receiver 904 measures the time of arrival from when the signal is transmitted by the transmitter 900 to when the signal is received by the receiver 904 from the transmitter 900 via the target 902. The bistatic range 910 defines an ellipse of constant bistatic range, referred to an iso-range contour, on which the target 902 lies, with foci centered on the transmitter 900 and the receiver 904. If the target 902 is at range Rrx from the receiver 904 and range Rtx from the transmitter 900, and the receiver 904 and the transmitter 900 are located a distance L apart from one another, then the bistatic range is equal to Rrx+Rtx−L. It should be noted that motion of the target 902 causes a rate of change of bistatic range, which results in bistatic Doppler shift.

Generally, constant bistatic range points draw an ellipsoid, with the transmitter 900 and the receiver 904 positions as the focal points. The bistatic iso-range contours are where the ground slices the ellipsoid. When the ground is flat, this intercept forms an ellipse (e.g., bistatic range 910). Note that except when the two platforms have equal altitude, these ellipses are not centered on a specular point.

Figure 10:
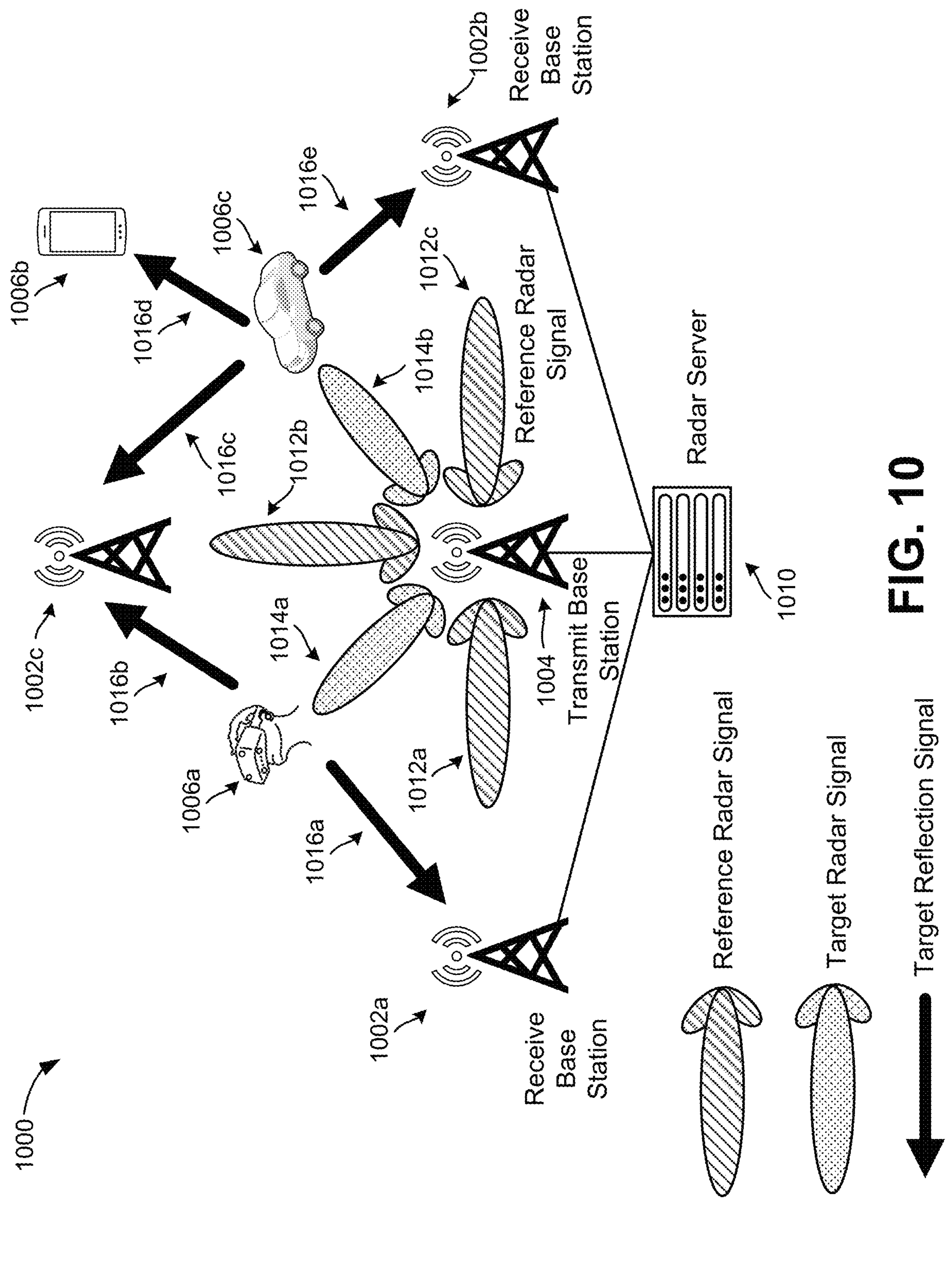
FIG. 10 is a diagram illustrating an example of a system for joint MIMO communications and MIMO sensing, where the system may employ multistatic sensing for cooperative sensing of UEs, in accordance with some aspects of the present disclosure.

FIG. 10 is a diagram illustrating an example of a system 1000 for joint MIMO communications and MIMO sensing, in accordance with some aspects of the present disclosure. The system 1000 may employ multistatic sensing for cooperative sensing of UEs **1006*a*, 1006*b*, 1006*c*. In FIG. 10, the system 1000 is shown to include a plurality of network devices and network entities. The plurality of network devices includes UEs 1006*a*, 1006*b*, 1006*c*, which may be in various different types of forms including, but not limited to, mobile devices or phones (e.g., UE 1006*b*), extended reality (XR) devices such as augmented reality (AR) or virtual reality (VR) headsets (e.g., UE 1006*a*), network-connected or smart watches, vehicles (e.g., UE 1006*c*), and/or other types of network devices. The network entities may be in the form of a radar server 1010. The network entities can be in the form of base stations 1002*a*, 1002*b*, 1002*c*, 1004 (e.g., a gNB or eNB), or a portion of a base station having a disaggregated architecture (e.g., one or more of a central unit (CU), a distributed unit (DU), a radio unit (RU), a Near-Real Time (Near-RT) RAN Intelligent Controller (RIC), or a Non-Real Time (Non-RT) RIC of the base station). In one or more examples, the network entities (e.g., the base stations 1002***a*, 1002*b*, 1002*c*, 1004, and radar server 1010) may be co-located together, or may be located remote from one another.

The system 1000 may include more or less network devices and/or more or less network entities, than as shown in FIG. 10. In addition, the system 1000 may include more or less different types of network devices and/or network entities (e.g., network servers), than as shown in FIG. 10. In addition, in one or more examples, the network devices (e.g., UEs 1006*a*, 1006*b*, 1006*c*) may be equipped with heterogeneous capability, which may include, but is not limited to, C-V2X/DSRC capability, 4G/5G cellular connectivity, GPS capability, camera capability, or other sensor-based capability (e.g., light or sound-based sensors such as a depth sensor using any suitable technology for determining depth).

The network devices (e.g., UEs 1006*a*, 1006*b*, 1006*c*) and network entities (e.g., base stations 1002*a*, 1002*b*, 1002*c*, 1004, and radar server 1010) may be capable of performing communications (e.g., 5G NR communications) with each other. In such cases, the UEs 1006*a*, 1006*b*, 1006*c* may transmit signals (e.g., communications signals) to each other. The UEs 1006*a*, 1006*b*, 1006*c* and the base stations 1002*a*, 1002*b*, 1002*c*, 1004 may transmit signals (e.g., communications signals) to each other. When the radar server 1010 is located remote from the base stations 1002*a*, 1002*b*, 1002*c*, 1004, the radar server 1010 and the base stations 1002*a*, 1002*b*, 1002*c*, 1004 may transmit signals (e.g., communication signals) to each other.

In one or more examples, the network devices and/or network entities (e.g., base stations 1002*a*, 1002*b*, 1002*c*, 1004) may be capable of transmitting and receiving sensing signals of some kind (e.g., camera, RF sensing signals, optical sensing signals, etc.). In some cases, at least some of the network devices and/or network entities (e.g., base stations 1002*a*, 1002*b*, 1002*c*, 1004) may transmit and/or receive sensing signals (e.g., RF sensing signals, such as radar target signals 1014*a*, 1014*b*, shown as beams transmitted from the network entities) to detect nearby UEs (e.g., UEs 1006*a*, 1006*b*, 1006*c*) and/or objects using one or more RF sensing techniques (e.g., monostatic, bistatic, and/or multistatic sensing for cooperative sensing), as previously described. In some cases, the network devices and/or network entities can detect nearby UEs and/or objects based on one or more images or frames captured using one or more cameras.

The base station 1004, which may operate as a radar transmitter, and the base stations 1002*a*, 1002*b*, 1002*c*, which may operate as radar receivers, may perform RF sensing (e.g., bistatic and/or multistatic sensing for cooperative sensing) of the targets (e.g., UEs 1006*a*, 1006*b*, 1006*c*) to obtain RF sensing measurements (e.g., RTT, TOA, and/or TDOA measurements) of the targets (e.g., UEs 1006*a*, 1006*b*, 1006*c*). In one or more examples, the system 1000 may utilize more than one radar receiver (e.g., base stations 1002*a*, 1002*b*, 1002*c*), more than one radar transmitter (e.g., base station 1004), more than one network entity (e.g., radar server 1010), and/or more than one target (e.g., UEs 1006*a*, 1006*b*, 1006*c*) for performing bistatic or multistatic sensing. In some examples, at least one radar transmitter (e.g., base station 1004) may be co-located with a radar receiver (e.g., base stations 1002*a*, 1002*b*, 1002*c*) for performing monostatic sensing. The use of bistatic/multistatic sensing, which includes the radar transmitter and radar receiver(s) located remotely from one another, avoids self-interference that may occur in monostatic sensing. The cooperative sensing scheme shown in the system 1000 of FIG. 10 allows for wide-area bistatic/multistatic sensing that may be employed in cellular networks, and allows for a means to manage the interference in the sensing and the joint communications and sensing (JCS).

The RF sensing measurements of the targets (e.g., UEs 1006*a*, 1006*b*, 1006*c*) can be used (e.g., by at least one processor(s) of the radar server 1010) to determine one or more characteristics (e.g., location, distance, movement, heading, size, and/or other characteristics) of the targets (e.g., UEs 1006*a*, 1006*b*, 1006*c*). The characteristics of the targets (e.g., UEs 1006*a*, 1006*b*, 1006*c*) can be indicative of the sensing environment of the radar receivers (e.g., base stations 1002*a*, 1002*b*, 1002*c*), and can be used (e.g., by at least one processor(s) of the radar server 1010) to determine the sensing measurement accuracy of the radar receivers (e.g., base stations 1002*a*, 1002*b*, 1002*c*). In one or more examples, additional measurements (e.g., light detection and ranging (LIDAR) measurements, ultrasound measurements, and/or positioning measurements), which may be obtained from radar reference signals 1012*a*, 1012*b*, 1012*c* (shown as beams), may also be used to determine the sensing measurement accuracy of the radar receivers (e.g., base stations 1002*a*, 1002*b*, 1002*c*).

In some cases, the system of 1000 FIG. 10 may perform radar-based sensing. For example, the radar receivers (e.g., base stations 1002*a*, 1002*b*, 1002*c*) may determine the characteristics of the targets (e.g., UEs 1006*a*, 1006*b*, 1006*c*), and may determine the sensing measurement accuracy of the radar receivers (e.g., base stations 1002*a*, 1002*b*, 1002*c*). Additionally or alternatively, in some cases, the system 1000 may perform network-based sensing. For instance, the network entity (e.g., radar server 1010) may determine the characteristics of the targets (e.g., UEs 1006*a*, 1006*b*, 1006*c*), and may determine the sensing measurement accuracy for the radar receivers (e.g., base stations 1002*a*, 1002*b*, 1002*c*).

In one or more examples, the system 1000 may perform MIMO operations, such as multiple user-MIMO (MU-MIMO) operations. In MU-MIMO, multiple users (e.g., base stations 1002*a*, 1002*b*, 1002*c*) share the same time and frequency resources, while the transmitter (e.g., base station 1004) is equipped with multiple antennas (e.g., at least one antenna array, which includes a plurality of antenna elements, such as physical antenna ports 1404 of FIG. 14, described below) and serves many receivers (e.g., base stations 1002*a*, 1002*b*, 1002*c*) simultaneously. Each receiver (e.g., base stations 1002*a*, 1002*b*, 1002*c*) need only employ a single antenna and, as such, complex hardware is only required at the transmitter side (e.g., base station 1004). In some examples, the system 1000 may perform Massive MIMO (mMIMO) operations. mMIMO is a form of MU-MIMO that employs a larger number of antennas on the transmitter side (e.g., base station 1004) than MU-MIMO and, as such, the number of users (e.g., base stations 1002*a*, 1002*b*, 1002*c*) served can be increased significantly as compared to MU-MIMO. In one or more examples, when the system 1000 performs MIMO operations (e.g., MU-MIMO operations), the network device and/or network entity (e.g., base station 1004) operating as the transmitter may include at least one antenna array (e.g., a direct radiating antenna array and/or a phase antenna array), which can include a plurality of antenna elements (e.g., antenna horns, patch antenna elements, cupped-dipole antenna elements, and/or dipole antenna elements). Each of the antenna elements and/or groupings of the antenna elements can be used to form a plurality of antenna signals 1012*a*, 1012*b*, 1012*c*, 1014*a*, 1014*b* (shown as beams) to be transmitted from the transmitter (e.g., base station 1004). In one or more examples, the network entity (e.g., radar server 1010) can manage and/or initiate beam coordination of the antenna signals 1012*a*, 1012*b*, 1012*c*, 1014*a*, 1014*b* for cooperative sensing.

During operation of the system 1000 for MU-MIMO (e.g., mMIMO) radar-based sensing, for example when performing bistatic/multistatic sensing of targets (e.g., UEs 1006*a*, 1006*c*), a radar transmitter (e.g., base station 1004) may transmit RF sensing signals (e.g., radar target signals 1014*a*, 1014*b*) towards the targets (e.g., UEs 1006*a*, 1006*c*). The sensing signals (e.g., radar target signals 1014*a*, 1014*b*) can reflect off of the targets (e.g., UEs 1006*a*, 1006*c*) to produce RF reflection sensing signals 1016*a*, 1016*b*, 1016*c*, 1016*d*, 1016*c*. Radar receivers (e.g., base stations 1002*a*, 1002*b*, 1002*c*, and UE 1006*b*) can receive the reflection sensing signals. At least one processor (e.g., processor 522 of FIG. 5) of each of the radar receivers (e.g., base stations 1002*a*, 1002*b*, 1002*c*, and UE 1006*b*) may then determine or compute the characteristics (e.g., location, distance, movement, heading, size, etc.) of the targets (e.g., UEs 1006*a*, 1006*c*) by using sensing measurements from the received reflection sensing signals. As previously noted, the characteristics of the targets (e.g., UEs 1006*a*, 1006*c*) may be indicative of the sensing environment related to the radar receivers (e.g., base stations 1002*a*, 1002*b*, 1002*c*, and UE 1006*b*).

In some cases, during operation, the radar transmitter (e.g., base station 1004) may transmit RF radar reference signals 1012*a*, 1012*b*, 1012*c* towards the radar receivers (e.g., base stations 1002*a*, 1002*b*, 1002*c*). The radar receivers (e.g., base stations 1002*a*, 1002*b*, 1002*c*) can receive the radar reference signals 1012*a*, 1012*b*, 1012*c*. At least one processor (e.g., processor 522 of FIG. 5) of each of the radar receivers (e.g., base stations 1002*a*, 1002*b*, 1002*c*) may then determine (compute) performance metrics (e.g., operating range, maximum range, and/or range/Doppler accuracy) for the radar receivers (e.g., base stations 1002*a*, 1002*b*, 1002*c*) by using sensing measurements from the received radar reference signals 1012*a*, 1012*b*, 1012*c* as well as, optionally, using information regarding the sensing environment related to the radar receivers (e.g., base stations 1002*a*, 1002*b*, 1002*c*).

In one or more examples, the radar reference signals 1012*a*, 1012*b*, 1012*c* may be employed for monostatic sensing. For these examples for monostatic sensing, the radar reference signals 1012*a*, 1012*b*, 1012*c* will reflect off of the radar receivers (e.g., base stations 1002*a*, 1002*b*, 1002*c*) and produce reflection radar reference signals, which will propagate back towards the radar transmitter (e.g., base station 1004). The radar transmitter (e.g., base station 1004) can then determine (compute) performance metrics (e.g., operating range, maximum range, and/or range/Doppler accuracy) for the radar receivers (e.g., base stations 1002*a*, 1002*b*, 1002*c*) by using sensing measurements from the reflection radar reference signals as well as, optionally, using information regarding the sensing environment related to the radar receivers (e.g., base stations 1002*a*, 1002*b*, 1002*c*).

In some examples, the radar receivers (e.g., base stations 1002*a*, 1002*b*, 1002*c* and UE 1006*b*) may transmit the determined characteristics (e.g., location, distance, movement, heading, size, etc.) of the targets (e.g., UEs 1006*a*, 1006*c*) and/or the computed performance metrics (e.g., operating range, maximum range, and/or range/Doppler accuracy) for the radar receivers (e.g., base stations 1002*a*, 1002*b*, 1002*c*) to a network entity (e.g., radar server 1010).

In some examples, the network entity (e.g., radar server 1010) can determine the characteristics (e.g., location, distance, movement, heading, size, etc.) of the targets (e.g., UEs 1006*a*, 1006*c*) and/or the performance metrics (e.g., operating range, maximum range, and/or range/Doppler accuracy) for the radar receivers (e.g., base stations 1002*a*, 1002*b*, 1002*c*). For example, during operation of the system for MU-MIMO (e.g., mMIMO) network-based RF sensing, for example when performing bistatic/multistatic sensing of the targets (e.g., UEs 1006*a*, 1006*c*), a radar transmitter (e.g., base station 1004) can transmit RF sensing signals (e.g., radar target signals 1014*a*, 1014*b*) towards the targets (e.g., UEs 1006*a*, 1006*c*). The sensing signals (e.g., radar target signals 1014*a*, 1014*b*) may reflect off of the targets (e.g., UEs 1006*a*, 1006*c*) to produce RF reflection sensing signals 1016*a*, 1016*b*, 1016*c*, 1016*d*, 1016*e*. Radar receivers (e.g., base stations 1002*a*, 1002*b*, 1002*c*, and UE 1006*b*) can receive the reflection sensing signals. The radar receivers (e.g., base stations 1002*a*, 1002*b*, 1002*c*, and UE 1006*b*) may then generate sensing measurements from the received reflected sensing signals.

In some examples, during operation, the radar transmitter (e.g., base station 1004) can transmit RF radar reference signals 1012*a*, 1012*b*, 1012*c* towards the radar receivers (e.g., base stations 1002*a*, 1002*b*, 1002*c*). The radar receivers (e.g., base stations 1002*a*, 1002*b*, 1002*c*) may receive the radar reference signals 1012*a*, 1012*b*, 1012*c*. The radar receivers (e.g., base stations 1002*a*, 1002*b*, 1002*c*) may then generate sensing measurements from the received radar reference signals 1012*a*, 1012*b*, 1012*c*.

In one or more examples, the radar reference signals 1012*a*, 1012*b*, 1012*c* may be employed for monostatic sensing. For these examples for monostatic sensing, the radar reference signals 1012*a*, 1012*b*, 1012*c* will reflect off of the radar receivers (e.g., base stations 1002*a*, 1002*b*, 1002*c*) and produce reflection radar reference signals, which will propagate back towards the radar transmitter (e.g., base station 1004). The radar transmitter (e.g., base station 1004) can then generate sensing measurements from the reflection radar reference signals.

In some examples, the radar receivers (e.g., base stations 1002*a*, 1002*b*, 1002*c*, and UE 1006*b*) and/or the radar transmitter (e.g., base station 1004) may transmit the sensing measurements from the received reflected sensing signals and/or the sensing measurements from the received radar reference signals 1012*a*, 1012*b*, 1012*c* (and/or the reflection radar reference signals) to the network entity (e.g., radar server 1010). At least one processor (e.g., processor 522 of FIG. 5) of the network entity (e.g., radar server 1010) may determine or compute the characteristics (e.g., location, distance, movement, heading, size, etc.) of the targets (e.g., UEs 1006*a*, 1006*c*) by using the sensing measurements from the received reflection sensing signals. The characteristics of the targets (e.g., UEs 1006*a*, 1006*c*) can be indicative of the sensing environment related to the radar receivers (e.g., base stations 1002*a*, 1002*b*, 1002*c*, and UE 1006*b*).

At least one processor (e.g., processor 522 of FIG. 5) of the network entity (e.g., radar server 1010) may then determine (compute) performance metrics (e.g., operating range, maximum range, and/or range/Doppler accuracy) for the radar receivers (e.g., base stations 1002*a*, 1002*b*, 1002*c*) by using the sensing measurements from the received radar reference signals 1012*a*, 1012*b*, 1012*c* (and/or the reflection radar reference signals) as well as, optionally, using information regarding the sensing environment related to the radar receivers (e.g., base stations 1002*a*, 1002*b*, 1002*c*).

Figure 11:
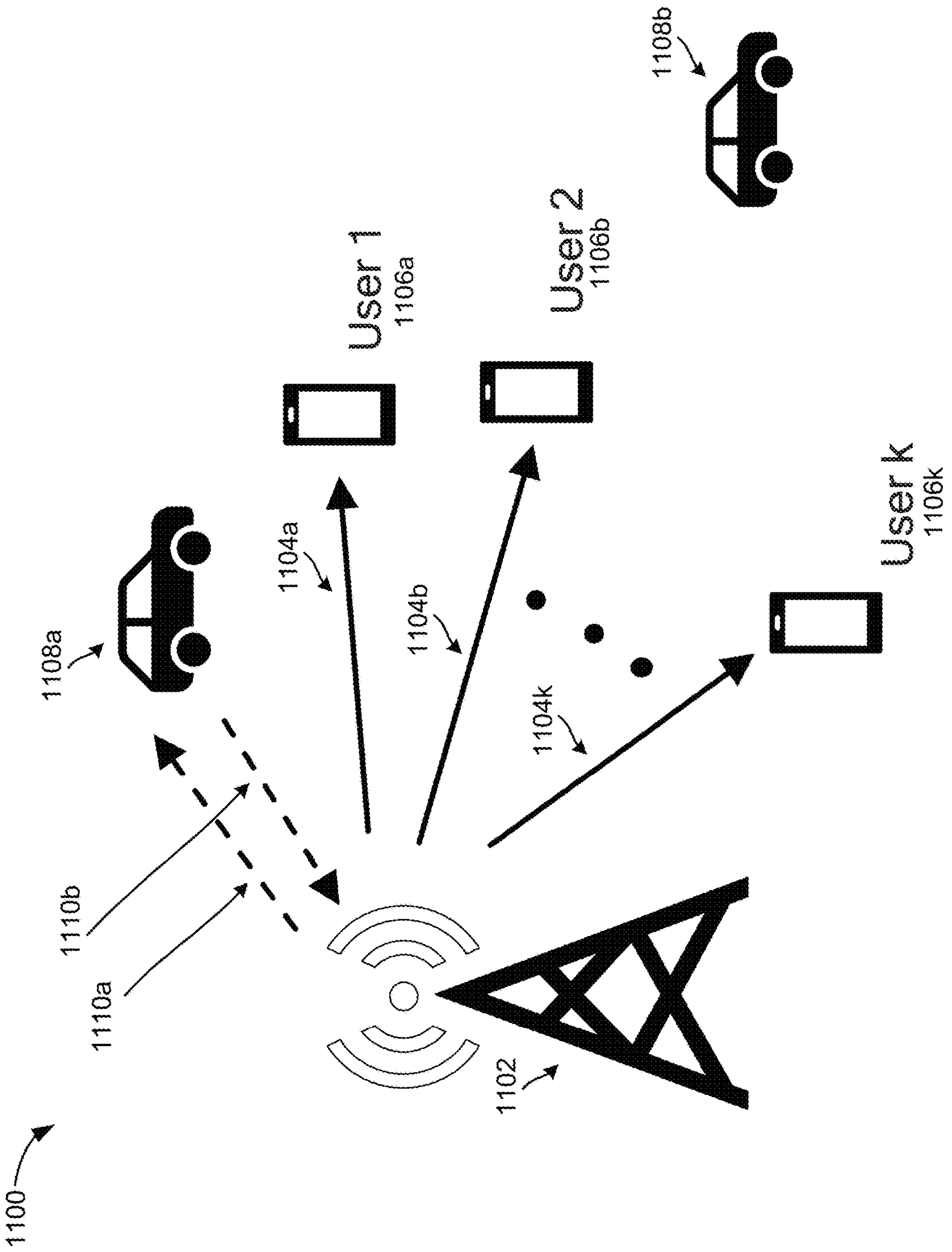
FIG. 11 is a diagram illustrating an example of a system for joint MIMO communications and MIMO sensing, where the system performs MU-MIMO downlink communications and monostatic MIMO monostatic sensing of one or more UEs, in accordance with some aspects of the present disclosure.

FIG. 11 is a diagram illustrating an example of a system 1100 for joint MIMO communications and MIMO sensing, in accordance with some aspects of the present disclosure. The system 1100 may perform MIMO (e.g., MU-MIMO, mMIMO, etc.) downlink communications and monostatic MIMO sensing of a UE (e.g., UE 1108*a*). In FIG. 11, the system 1100 is shown to include a plurality of network devices and a network entity. The plurality of network devices includes UEs 1108*a*, 1108*b*, 1106*a*, 1106*b*, 1106*k*, which may be in various different types of forms including, but not limited to, mobile devices or phones (e.g., UEs 1106*a*, 1106*b*, 1106*k*), extended reality (XR) devices such as augmented reality (AR) or virtual reality (VR) headsets, network-connected or smart watches, vehicles (e.g., UEs 1108*a*, 1108*b*), and/or other types of devices. The network entity can be in the form of a base station 1102 (e.g., a gNB or eNB), or a portion of a base station having a disaggregated architecture (e.g., one or more of a central unit (CU), a distributed unit (DU), a radio unit (RU), a Near-Real Time (Near-RT) RAN Intelligent Controller (RIC), or a Non-Real Time (Non-RT) RIC of the base station).

The system 1100 may include more or less network devices and/or more or less network entities, than as shown in FIG. 11. In addition, the system 1100 may include more or less different types of network devices and/or network entities (e.g., network servers), than as shown in FIG. 11. In addition, in one or more examples, the network devices (e.g., UEs 1108*a*, 1108*b*, 1106*a*, 1106*b*, 1106*k*) may be equipped with heterogeneous capability, which may include, but is not limited to, C-V2X/DSRC capability, 4G/5G cellular connectivity, GPS capability, camera capability, or other sensor-based capability (e.g., light or sound-based sensors such as a depth sensor using any suitable technology for determining depth).

The network devices (e.g., UEs 1108*a*, 1108*b*, 1106*a*, 1106*b*, 1106*k*) and network entity (e.g., base station 1102) may be capable of performing communications (e.g., 5G NR communications) with each other. In such cases, for example, the network entity (e.g., base station 1102) may transmit communications signals (e.g., communications signals 1104*a*, 1104*b*, 1104*c*) to the UEs (e.g., UEs 1106*a*, 1106*b*, 1106*k*).

In one or more examples, the network devices and/or network entity (e.g., base station 1102) may be capable of transmitting and receiving sensing signals of some kind (e.g., camera, RF sensing signals, optical sensing signals, etc.). In some cases, the network devices and/or network entity (e.g., base station 1102) may transmit and receive sensing signals (e.g., RF sensing signals 1110*a*) for using one or more sensors to detect nearby UEs (e.g., UE 1108*a*) and/or objects. In some cases, the network devices and/or network entity (e.g., base station 1102) can detect nearby UEs and/or objects based on one or more images or frames captured using one or more cameras.

The base station 1102, which may operate as both a radar transmitter and a radar receiver, may perform RF sensing (e.g., monostatic sensing) of at least one target (e.g., UE 1108*a*) to obtain RF sensing measurements (e.g., RTT, TOA, and/or TDOA measurements) of the target(s) (e.g., UEs 1108*a*). The RF sensing measurements of the target(s) (e.g., UE 1108*a*) can be used (e.g., by at least one processor(s) of the base station 1102 or a radar server) to determine one or more characteristics (e.g., location, distance, movement, heading, size, and/or other characteristics) of the target(s) (e.g., UE 1108*a*). The characteristics of the target(s) (e.g., UE 1108*a*) can be indicative of the sensing environment of the base station 1102, and can be used (e.g., by at least one processor(s) of the base station 1102 or radar server) to determine the sensing measurement accuracy of the base station 1102.

In some examples, the system of 1100 FIG. 11 may perform radar-based sensing, in which the base station 1102 may determine the characteristics of at least one target (e.g., UE 1108*a*), and may determine the sensing measurement accuracy the base station 1102. Additionally or alternatively, in some examples, the system 1100 of FIG. 11 may perform network-based sensing, in which the base station 1102 may determine the characteristics of at least one target (e.g., UE 1108*a*), and may determine the sensing measurement accuracy for the base station 1102.

In one or more examples, the system 1100 may perform MU-MIMO (e.g., mMIMO) operations. In MU-MIMO, multiple users (e.g., UEs 1108*a*, 1108*b*, 1106*a*, 1106*b*, 1106*k*) share the same time and frequency resources, while the base station 1102 is equipped with multiple antennas (e.g., at least one antenna array, which includes a plurality of antenna elements, such as physical antenna ports 1404 of FIG. 14) and serves many users (e.g., UEs 1108*a*, 1108*b*, 1106*a*, 1106*b*, 1106*k*) simultaneously. In one or more examples, when the system 1100 performs MIMO operations (e.g., MU-MIMO operations), the base station 1102 may include at least one antenna array (e.g., a direct radiating antenna array and/or a phase antenna array), which can include a plurality of antenna elements (e.g., antenna horns, patch antenna elements, cupped-dipole antenna elements, and/or dipole antenna elements).

Each of the antenna elements and/or groupings of the antenna elements of the antenna array(s) can be used to form a plurality of antenna beams to be transmitted from the base station 1102 to the users (e.g., UEs 1108*a*, 1106*a*, 1106*b*, 1106*k*). Each of the antenna beams may include at least one respective signal (e.g., signals 1110*a*, 1104*a*, 1104*b*, 1104*k*), which may be a communication signal, a sensing signal, or a joint communications and sensing signal. In the system 1100 of FIG. 11, the antenna beams are shown to include a sensing signal 1110*a* and a plurality of communications signals 1104*a*, 1104*b*, 1104*k*. In one or more examples, a network entity (e.g., a radar server) can manage and/or initiate beam coordination of the antenna beams of the base station 1102 for cooperative sensing.

During operation of the system 1100 for MU-MIMO (e.g., mMIMO) radar-based sensing, for example when performing monostatic sensing of a target (e.g., UE 1108*a*), a base station 1102 (operating as a radar transmitter) may transmit an RF sensing signal 1110*a* towards the target (e.g., UE 1108*a*). The sensing signal 1110*a* can reflect off of the target (e.g., UEs 1108*a*) to produce an RF reflection sensing signal 1110*b*, which is reflected back towards the base station 1102. The base station 1102 (also operating as a radar receiver) can receive the reflection sensing signal 1110*b*. At least one processor (e.g., processor 522 of FIG. 5) of the base station 1102 may then determine or compute the characteristics (e.g., location, distance, movement, heading, size, etc.) of the target (e.g., UE 1108*a*) by using sensing measurements from the received reflection sensing signal 1110*b*. In some examples, the base station 1102 may transmit the determined characteristics (e.g., location, distance, movement, heading, size, etc.) of the target (e.g., UE 1108*a*) to a network entity (e.g., a radar server).

In some examples, a network entity (e.g., radar server) can determine the characteristics (e.g., location, distance, movement, heading, size, etc.) of the target (e.g., UE 1108*a*). For example, during operation of the system for MU-MIMO (e.g., mMIMO) network-based RF sensing, for example when performing monostatic sensing of the target (e.g., UE 1108*a*), the base station 1102 (operating as a radar transmitter) can transmit an RF sensing signal 1110*a* towards the target (e.g., UE 1108*a*). The sensing signal 1110*a* may reflect off of the target (e.g., UE 1108*a*) to produce an RF reflection sensing signal 1110*b*. The base station 1102 (operating also as a radar receiver) can receive the reflection sensing signal 1110*b*. The base station 1102 may then generate sensing measurements from the received reflected sensing signal 1110*b*.

In some examples, base station 1102 may transmit the sensing measurements from the received reflected sensing signal 1110*b* to a network entity (e.g., radar server). At least one processor (e.g., processor 522 of FIG. 5) of the network entity (e.g., radar server) may determine or compute the characteristics (e.g., location, distance, movement, heading, size, etc.) of the target (e.g., UE 1108*a*) by using the sensing measurements from the received reflection sensing signal 1110*b*.

In one or more examples, the system 1100 of FIG. 11, which may perform monostatic MU-MIMO sensing, may employ at least one unified waveform for joint MIMO communications and MIMO sensing (e.g., a JCS waveform). In some examples, a multi-antenna JCS transceiver (e.g., a network entity, such as base station 1102) may schedule and generate the waveform(s).

In one or more examples, the base station 1102 may have $N_t$ number of transmit antenna elements (e.g., $N_t$ Tx) in its antenna array(s) and $N_r$ number of receive antenna elements (e.g., $N_r$ Rx) in its antenna array(s). The base station 1102 may serve k number of users (e.g., UEs 1108*a*, 1108*b*, 1106*a*, 1106*b*, 1106*k*). During operation, the base station 1102 (e.g., gNB) may detect targets (e.g., UEs 1108*a*, 1106*a*, 1106*b*, 1106*k*) and estimate parameters or characteristics (e.g., location, distance, movement, heading, size, etc.) of the targets.

Since, for example during a target detection phase, prior information regarding the number of the targets (e.g., UE 1108*a*) is unknown to the base station 1102, the base station 1102 (e.g., gNB) can maximize the degrees of freedom in its hardware (e.g., maximize the number of antenna elements utilized to transmit the different waveforms). In doing so, the base station 1102 (e.g., gNB) can transmit a rank $N_t$ waveform (e.g., orthogonal waveform) for the MIMO sensing of the targets. For example, in a MIMO radar system, each transmit antenna element of the base station 1102 (e.g., gNB) may transmit an orthogonal waveform. If there are a total of $N_t$ transmit antenna elements in the antenna array, then maximally the base station 1102 (e.g., gNB) can transmit $N_t$ number of waveforms that are orthogonal to each other, thereby forming a waveform with rank $N_t$.

However, the transmitting of a rank $N_t$ waveform for the MIMO sensing of the targets may lead to a conflict between the sensing and the communications. For instance, in some MU-MIMO communications, the number of degrees of freedom (DoFs) is limited by the minimum number of transmit antennas $N_t$ of the base station 1102 (e.g., gNB), which is min ($N_t$; J), where J is less than $N_t$ ($J<N_t$), especially for mMIMO scenarios. The term J is the number of layers (e.g., communication orthogonal waveforms) that the base station 1102 (e.g., gNB) may schedule for its MU-MIMO downlink (DL) communications.

The base station 1102 (e.g., gNB) can estimate the rank of the channel, such as based on channel state information (CSI) feedback from the UEs (e.g., UE 1108*a*). Based on the estimated rank of the channel, the base station 1102 (e.g., gNB) can determine the scheduling of the time/frequency resources for the waveform. However, the scheduling of the time/frequency resources and the waveform according to the CSI for MU-MIMO downlink communications (e.g., baseline for LTE/NR) may not fully exploit the waveform diversity for MIMO sensing. As such, the design metrics for MIMO communications and sensing can be conflicting. The systems and techniques described herein provide for unified waveforms (e.g., JCS waveforms) to efficiently enable joint MIMO sensing and MIMO (e.g., MU-MIMO, mMIMO, etc.) downlink communications for achieving a high spectral efficiency.

In one or more examples, the base station 1102 (e.g., gNB) may schedule and generate a JCS waveform (e.g., waveform X of rank $N_t$) for a joint transmission scheme to serve both communication and sensing purposes. In some cases, a matrix $S_C$ represents or includes communications resources of the JCS waveform and a matrix $S_A$ represents or includes sensing resources of the JCS waveform. In some examples, the base station 1102 (e.g., gNB) can augment the data matrix $S_C$ (including the communications resources) for the waveform X by adding $N_t$–J number of dedicated sensing streams (including sensing resources) to the matrix $S_A$, which may result in the waveform having a maximum of $N_t$–J dedicated sensing streams (with sensing resources). For instance, the $N_t$–J number of dedicated sensing streams (and corresponding sensing resources) may be used for sensing and may contain no information (while the communications resources include communications data). Then, the generated waveform X is rank $N_t$ and can be represented as follows:

$$X = W_C S_C + W_A S_A$$

where the matrix $S_C$ is rank J, and the matrix $S_A$ is rank Nt–J. $W_C$ and $W_A$ are matrices. For waveform X, orthogonality between $W_C S_C$ and $W_A S_A$ is desirable. Waveform X is a JCS waveform of rank $N_t$ that can be employed for joint MIMO communications and MIMO sensing (e.g., monostatic sensing, bistatic sensing, or multistatic sensing).

As noted above, the $N_t$–J number of dedicated sensing steams is the maximum amount of sensing streams that can be allocated for waveform X. For example, during a target detection phase, when the base station 1102 (e.g., gNB or portion thereof, such as a CU, DU, RU, etc. of a disaggregated gNB) does not have any knowledge regarding the target(s), the base station 1102 may add the maximum number (e.g., $N_t$–J number) of sensing streams (sensing resources) for waveform X to maximize the degrees of freedom in an effort to locate the target(s). However, for example, during a target tracking phase where the base station 1102 has some general knowledge regarding the location(s) of the target(s), the base station 1102 may use less than the maximum number (e.g., $N_t$–J number) of sensing streams for waveform X because less degrees of freedom are needed to locate the target(s).

In some aspects, this joint precoder design (e.g., of the JCS waveform) enables spatial domain multiplexing (SDM), which allows for spatially correlated (e.g., spatially aligned) UEs to be able to use the JCS waveform for both communications and sensing. For example, the communication waveform can be reused for sensing when the targets (e.g., UEs 1108*a*, 1106*a*, 1106*b*, 1106*k*) and UEs (e.g., UE 1108*b*) are spatially correlated (e.g., a target(s) and a UE(s) are spatially aligned in the same direction with each other).

In one or more examples, if the sensing is stand alone (e.g., without any cross-base station or cross-device coordination for the sensing) and monostatic (e.g., where the base station is solely performing the sensing itself), the base station 1102 may control the scheduling of the dedicated sensing streams (e.g., sensing resources). For example, in such examples, the base station 1102 may determine the waveform parameters for each of the sensing streams.

Conversely, if the sensing is network-based cooperative sensing (e.g., where the sensing server, such as radar server 1010 of FIG. 10, assists in the scheduling of the sensing resources), the sensing server (e.g., radar server 1010 of FIG. 10) may guide the base station 1102 to perform the scheduling of the dedicated sensing streams (sensing resources). For such network-based cooperative sensing, the base station 1102 may report its partial CSI, the number of layers for the downlink MIMO communications, and/or other information to the sensing server. After the sensing server receives partial CSI from one or more base stations (e.g., base station 1102), the sensing server may guide the base stations for scheduling the additional sensing streams (e.g., additional sensing streams from the additional $N_t$–J number of dedicated sensing streams). In one or more examples, the sensing server may determine which base station of the base stations should operate as the sensing transmitter (e.g., radar transmitter), by considering the partial CSI from the base stations and the hardware capability of the base stations. For example, if the supported dedicated sensing streams supported by base station 1 may be greater than (>) the supported dedicated sensing streams supported by base station 2, then the sensing server may choose base station 1 to operate as the MIMO sensing transmitter (e.g., radar transmitter) to maximize the degrees of freedom, and may choose base station 2 to operate as the MIMO sensing receiver (e.g., radar receiver).

In one or more examples, the sensing server may signal (e.g., transmit signaling with) the sensing waveform parameters to the radar transmitter (e.g., base station 1) and to the radar receiver (e.g., base station 2). In other examples, the radar transmitter (e.g., base station 1) may signal (e.g., transmit signaling with) the number of dedicated sensing streams it plans to transmit to the sensing server (e.g., radar server 1010 of FIG. 10). It should be noted that the radar transmitter (e.g., base station 1) may also signal (e.g., transmit signaling with) other parameters associated with the sensing waveforms to the sensing server. The parameters and/or streams may be transmitted in one or more information elements (IEs) or fields of one or more messages. After receiving the parameters from the radar transmitter (e.g., base station 1), the sensing server may signal (e.g., transmit signaling) this information (e.g., the number of dedicated sensing streams and/or parameters associated with the sensing waveforms) to the radar receiver (e.g., base station 2).

In some cases, if a target (e.g., UE 1108*a*) and a UE (e.g., UE 1106*a*) are spatially correlated (e.g., spatially aligned with each other) and the dedicated sensing streams share the same time and frequency, the dedicated sensing streams may impact the performance of the downlink communications. In such cases, in one or more examples, if the sensing streams are OFDM based (e.g., the sensing streams include OFDM waveforms), the JCS waveform may be scheduled in one or more demodulation reference signal (DMRS) symbols, and the dedicated sensing streams can be orthogonal to DMRS antenna ports (e.g., logical antenna ports 1414 of FIG. 14) used to transmit the one or more DMRS symbols. Further in such cases, in one or more examples, if the sensing streams are OFDM based (e.g., the sensing streams include OFDM waveforms), the JCS waveform may be scheduled in one or more physical downlink shared channel (PDSCH) symbols. In some examples, when scheduled in one or more PDSCH symbols, the waveform orthogonality between the sensing streams and data streams (communication streams) may not be guaranteed because the PDSCH is a random signal. In some cases, if the sensing streams are non-OFDM based, the waveform orthogonality between the sensing streams and the data streams (communication streams) may not be guaranteed. The dedicated sensing streams, by default, are transparent to the UE (e.g., UE 1108*a*), unless the UE is also operating as the radar receiver for the sensing.

In one or more examples, to assist in interference cancellation at the UE side, the base station 1102 may signal (e.g., transmit signaling with) information associated with the sensing streams to the UEs (e.g., UE 1108*a*). In one or more examples, the information regarding the sensing streams may include, but is not limited to, additional antenna ports (e.g., logical antenna ports 1414 of FIG. 14) allocated for dedicated sensing streams, the time and frequency resource where the sensing streams are being added, the parameters for the sensing waveforms for each layer of the sensing streams, the power offset between the DMRS (or the PDSCH) and the sensing streams, any combination thereof, and/or other information. In some aspects, if the UE (e.g., UE 1108*a*) is served by multiple transmission/reception points (TRPs), the UE may receive multiple sets of assistance information (e.g., assistance data (AD)). In some cases, each set of assistance information corresponds to a dedicated sensing stream associated with a specific TRP (e.g., base station, such as a gNB).

Figure 12:
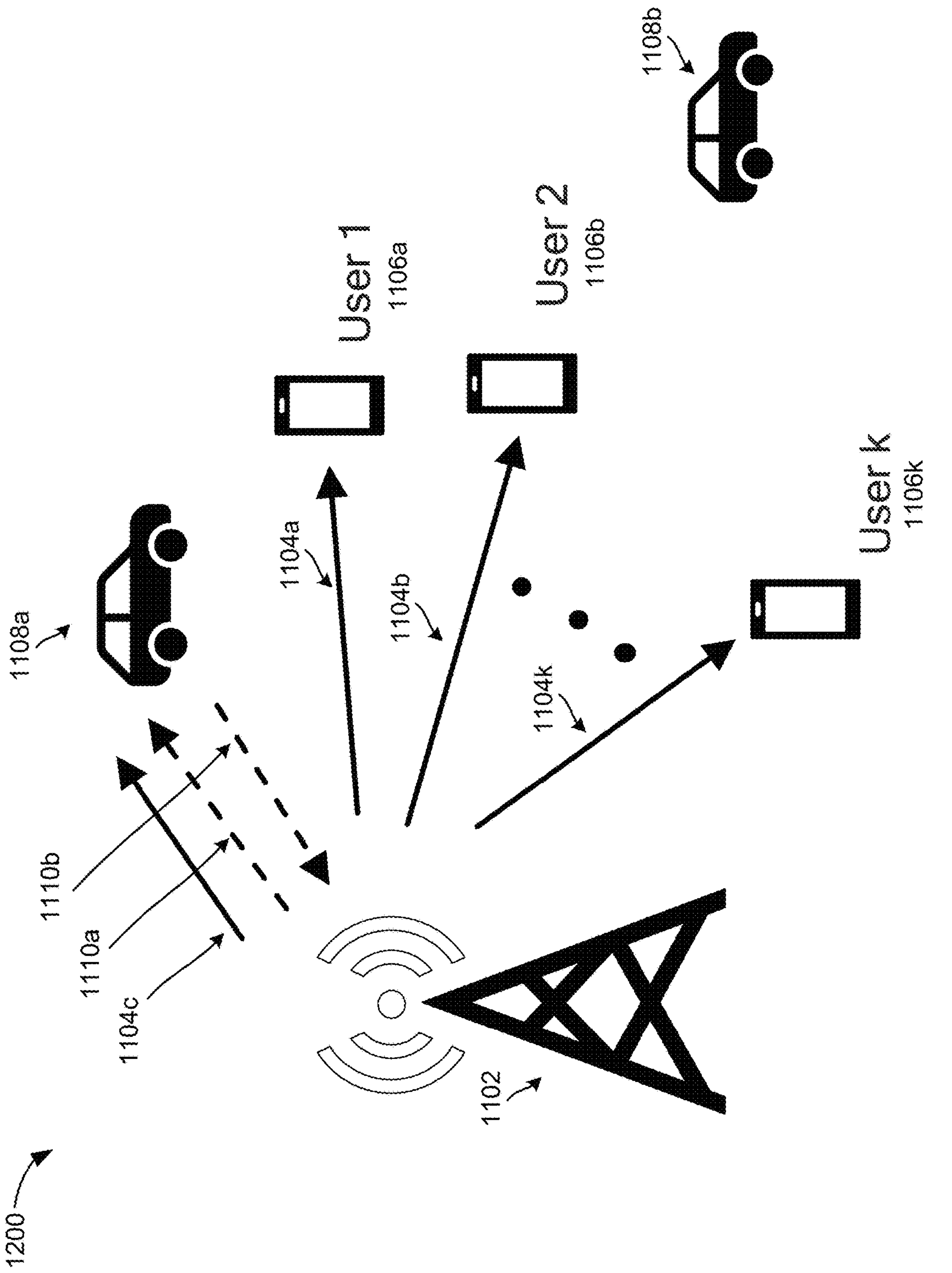
FIG. 12 is a diagram illustrating another example of a system for joint MIMO communications and MIMO sensing, where the system can utilize a JCS waveform for both communications and sensing of a UE, in accordance with some aspects of the present disclosure.

FIG. 12 is a diagram illustrating an example of a system 1200 for joint MIMO communications and MIMO sensing, where the system 1200 can utilize a JCS waveform for both communications and sensing (e.g., monostatic sensing) of a UE, in accordance with some aspects of the present disclosure. The system 1200 of FIG. 12 is similar to the system 1100 of FIG. 11, except that the base station 1102 shown in the system 1200 of FIG. 12 is additionally transmitting a communications signal 1104*c* to a UE (e.g., UE 1108*a*). Specifically, in FIG. 12, the base station 1102 is shown to be transmitting both a communications signal 1104*c* and a sensing signal 1110*a* to UE 1108*a*. As such, if the communications signal 1104*c* and the sensing signal 1110*a* share the same time and frequency, there could be a conflict between the signals because the signals are directed towards the same network device. In order to obviate this possible confliction, the base station 1102 may employ the disclosed JCS waveform for the communications and the sensing of UE 1108*a*.

Figure 13:
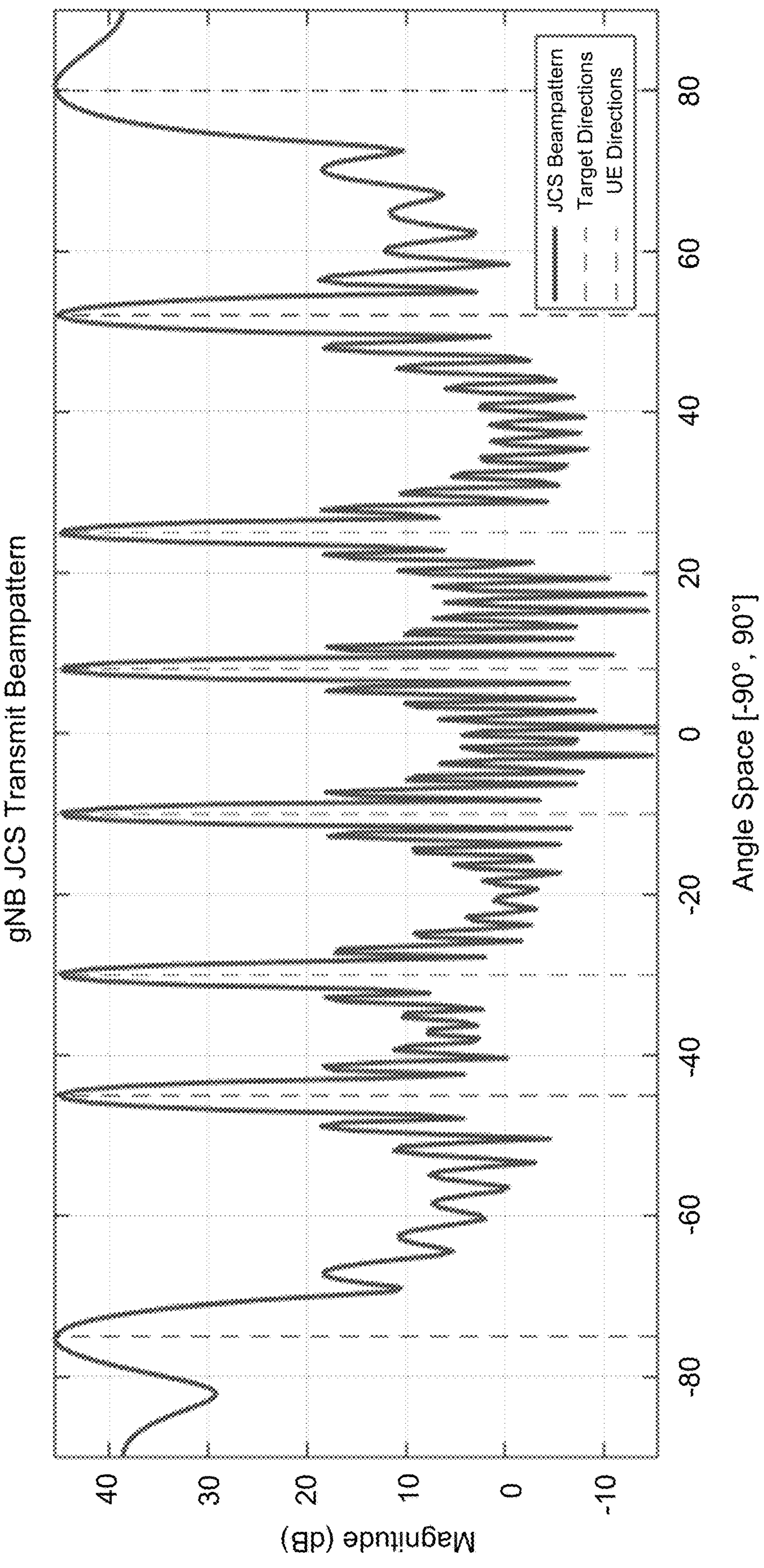
FIG. 13 is a graph illustrating an example of a joint communications and sensing (JCS) waveform that may be employed for the disclosed system for joint MIMO communications and MIMO sensing, in accordance with some aspects of the present disclosure.

FIG. 13 is a graph 1300 illustrating an example of a joint communications and sensing (JCS) waveform that may be employed for the disclosed system for joint MIMO communications and MIMO sensing, in accordance with some aspects of the present disclosure. In FIG. 13, the x-axis of the graph 1300 denotes the angle (from negative 90 degrees to positive 90 degrees), and the y-axis of the graph 1300 denotes the magnitude in decibels (dBs).

In particular, in FIG. 13, a cut of the beam pattern of an example JCS waveform is illustrated in the graph 1300. The beam pattern of the JCS waveform exhibits 8 distinct antenna beams, which may radiate in a plurality of different directions and may be formed by an antenna array of a JCS transceiver (e.g., base station 1102 of FIG. 11). The two wide antenna beams on either side of the beam pattern include communication signals to be transmitted to UEs (e.g., UEs 1106*a*, 1106*b*, 1106*k* of FIG. 11), which are located at approximately −75 degrees and 80 degrees. The six narrow antenna beams located between the two wide antenna beams include sensing signals to be transmitted towards UEs (e.g., UE 1108*a* of FIG. 11), which are located at −45 degrees, −30 degrees, −10 degrees, 8 degrees, 25 degrees, and 55 degrees.

Figure 14:
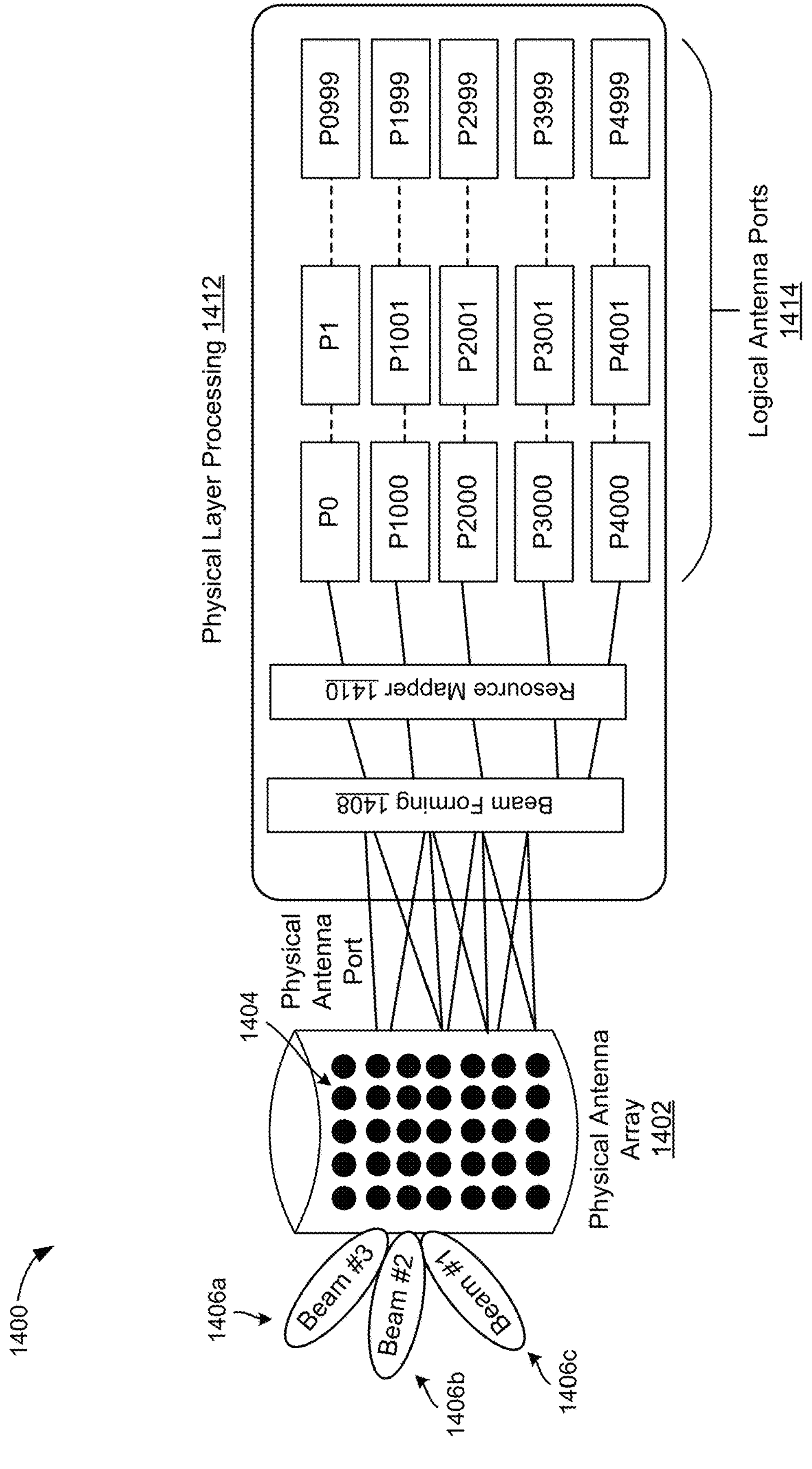
FIG. 14 is a diagram illustrating an example of a mapping of antenna ports to physical antenna ports, which may be employed by the disclosed systems and techniques for joint MIMO communications and MIMO sensing, in accordance with some aspects of the present disclosure.

FIG. 14 is a diagram 1400 illustrating an example of a mapping of antenna ports (e.g., logical antenna ports 1414) to physical antenna ports 1404, which may be employed by the disclosed systems and techniques for joint MIMO communications and MIMO sensing, in accordance with some aspects of the present disclosure. In 5G NR and 4G LTE, MIMO is a key technology that is frequently employed (e.g., MIMO transmission is often utilized in the downlink). The term "antenna port," as related to MIMO, is a logical concept related to the physical layer (e.g., Layer 1), not a physical concept related to a physical RF antenna located on a base station.

According to the 3GPP specification, an "antenna port" (e.g., logical antenna port 1414) is defined such that the channel over which a symbol on the antenna port is conveyed can be inferred from the channel over which another symbol on the same antenna port is conveyed. As such, each individual downlink transmission that is transmitted from a specific antenna port, the identity of which is known to the UE, the UE can assume that two transmitted signals have experienced the same channel if and only if they are transmitted from the same antenna port. Thus, each antenna port, at least for downlink transmissions, can be assumed to correspond to a specific reference signal, and a UE receiver can assume that the reference signal can be used to estimate the channel (as well as derive channel-state information (CSI)) corresponding to the antenna port.

The 3GPP specification 38.211 for 5G NR defines sets of antenna ports (e.g., logical antenna ports 1414) for the downlink as follows: the physical downlink shared channel (PDSCH) utilizes antenna ports starting from 1000 (the 1000 series), the physical downlink control channel (PDCCH) utilizes antenna ports starting from 2000 (the 2000 series), the channel state information-reference signal (CSI-RS) utilizes antenna ports starting from 3000 (the 3000 series), and the synchronization signal-block/physical broadcast channel (SS-Block/PBCH) utilizes antenna ports starting from 4000 (the 4000 series). The 3GPP specification 38.211 for 5G NR defines sets of antenna ports (e.g., logical antenna ports 1414) for the uplink as follows: the physical uplink shared channel/demodulation reference signal (PUSCH/DMRS) utilizes antenna ports starting from 0 (the 0 series), the sounding reference signals (SRS), precoded PUSCH, utilizes antenna ports starting from 1000 (the 1000 series), the physical uplink control channel (PUCCH) utilizes antenna ports starting from 2000 (the 2000 series), and the physical random access channel (PRACH) utilizes antenna ports starting from 4000 (the 4000 series). It should be noted that different transmission layers for a channel (e.g., PDSCH) may use different antenna ports in the defined series. For example, antenna ports 1000 and 1001 may be utilized for a two-layer PDSCH transmission.

It should be noted that an "antenna port" is an abstract concept that does not necessarily correspond to a specific physical antenna port (e.g., physical antenna port 1404). There is no strict mapping of antenna ports (e.g., logical antenna ports 1414) to physical antenna ports (e.g., physical antenna ports 1404) in 5G NR or 4G LTE. The mapping of an antenna port to a physical antenna port is controlled by beamforming, where a certain antenna beam needs to transmit a signal on certain antenna ports to form a desired antenna beam. There is a possibility that multiple antenna ports may be mapped to one physical antenna port, and/or a single antenna port may be mapped to multiple physical antenna ports.

In FIG. 14, in particular, an overview of an example of 5G physical layer processing 1412 is shown. The 5G physical layer processing 1412 is shown to include a beam forming network 1408, a resource mapper 1410, and a plurality of antenna ports (e.g., logical antenna ports 1414). The logical antenna ports 1414 are numbered from antenna port P0 to antenna port P4999, and are divided into a plurality of different series, which are separated out by rows in the figure. The plurality of different series of logical antenna ports 1414 includes series 0 spanning from antenna port P0 to antenna port P0999, series 1000 spanning from antenna port P1000 to antenna port P1999, series 2000 spanning from antenna port P2000 to antenna port P2999, series 3000 spanning from antenna port P3000 to antenna port 3999, and series 4000 spanning from antenna port P4000 to antenna port P4999.

Also in FIG. 14, a physical antenna array 1402 is shown to include a plurality of physical antenna ports 1404. In FIG. 14, the physical antenna array 1402 is shown to include a total of 35 physical antenna ports 1404. It should be noted that, in one or more examples, the physical antenna array 1402 may include more or less physical antenna ports 1404, than as is shown in FIG. 14. The physical antenna array 1402 may be in the form of various different types of physical antennas including, but not limited to, a direct radiating antenna array or a phased antenna array. The physical antenna array 1402 may include various different types of physical antenna elements, which may include, but are not limited to, horn antennas, patch antenna elements, cupped-dipole antenna elements, and/or dipole antenna elements. Each physical antenna element of the physical antenna array 1402 corresponds to a different physical antenna port 1404 of the physical antenna array 1402.

During operation of the 5G physical layer processing 1412, the beam forming network 1408 together with the resource mapper 1410 map the logical antenna ports 1414 to the physical antenna ports 1404 of the physical antenna array 1402 as required to form desired antenna beams 1406*a* (Beam 1), 1406*b* (Beam 2), 1406*c* (Beam 3). Specifically, the logical antenna ports 1414 are mapped to the physical antenna ports 1404 such that signals are transmitted on certain physical antenna ports 1404 as required to form the desired antenna beams 1406*a*, 1406*b*, 1406*c*.

As such, the logical antenna ports 1414 can be mapped to specific physical antenna ports 1404 of the physical antenna array 1402. For example, antenna port P0 may be mapped to the first physical antenna port 1404 in the physical antenna array 1402. It should be noted that multiple logical antenna ports 1414 may be mapped to only one physical antenna port 1404, and/or a single logical antenna port from the multiple logical antenna ports 1414 may be mapped to multiple physical antenna ports 1404.

Figure 15:
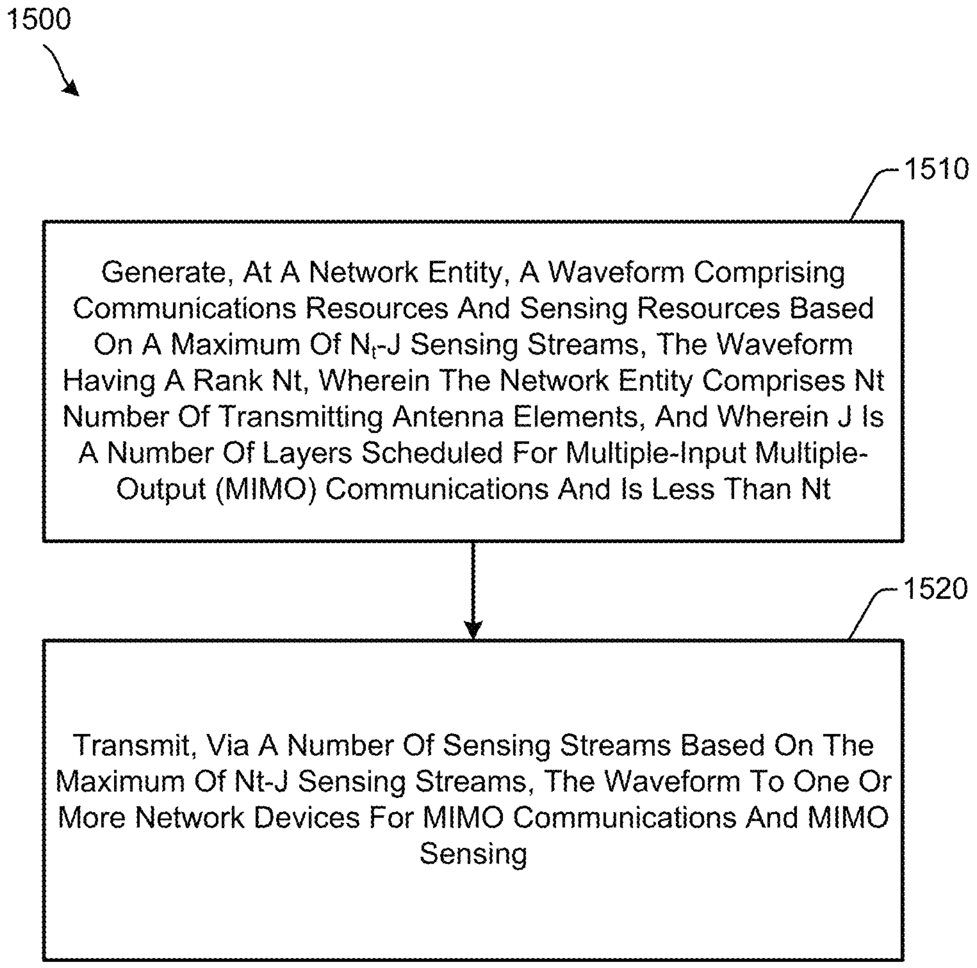
FIG. 15 is a flow chart illustrating an example of a process for wireless communications utilizing joint MIMO communications and MIMO sensing, in accordance with some aspects of the present disclosure.

FIG. 15 is a flow chart illustrating an example of a process 1500 for wireless communications utilizing joint MIMO communications and MIMO sensing. The process 1500 can be performed by a network entity (e.g., a base station such as an eNB or gNB, or one or more of a central unit (CU), a distributed unit (DU), a radio unit (RU), a Near-Real Time (Near-RT) RAN Intelligent Controller (RIC), or a Non-Real Time (Non-RT) RIC of a base station having a disaggregated architecture) or by a component or system (e.g., a chipset) of the network entity. The operations of the process 1500 may be implemented as software components that are executed and run on one or more processors (e.g., processor 1710 of FIG. 17 or other processor(s)). Further, the transmission and reception of signals by the wireless communications device in the process 1500 may be enabled, for example, by one or more antennas and/or one or more transceivers (e.g., wireless transceiver(s)).

At block 1510, the network entity (or component thereof) may generate a waveform including communications resources and sensing resources based on a maximum of $N_t$−J sensing streams. The waveform has a rank $N_t$ and the network entity includes $N_t$ number of transmitting antenna elements. J is a number of layers scheduled for multiple-input multiple-output (MIMO) communications (e.g., multiple-user MIMO (MU-MIMO) communications) and is less than $N_t$. In some cases, the network entity includes at least one antenna array including the transmitting antenna elements.

In some aspects, the waveform is defined using a matrix $S_C$ and a matrix $S_A$, as described herein. For instance, the matrix $S_C$ may represent the communications resources and the matrix $S_A$ may represent the sensing resources. In one illustrative example, the matrix $S_C$ is rank J and the matrix $S_A$ is rank $N_t$−J. In some cases, the waveform includes a first waveform $W_C S_C$ associated with the communications resources and a second waveform $W_A S_A$ associated with the sensing resources, wherein $W_C$ and $W_A$ are matrices. In some examples, the first waveform $W_C S_C$ and the second waveform $W_A S_A$ are orthogonal to each other. In some aspects, the communications resources include communications data, and the sensing resources include no data.

In some cases, the network entity (or component thereof) may schedule the waveform. In some cases, the waveform is scheduled by a radar server. In some aspects, the waveform is scheduled (e.g., by the network entity or component thereof, by the radar server, etc.) within a plurality of demodulation reference signal (DMRS) symbols. In such aspects, the $N_t$−J sensing streams may be orthogonal to a plurality of DMRS ports associated with the plurality of DMRS symbols. In some aspects, the waveform is scheduled (e.g., by the network entity or component thereof, by the radar server, etc.) within a plurality of physical downlink shared channel (PDSCH) symbols.

At block 1520, the network entity (or component thereof) may transmit, via a number of sensing streams based on the maximum of $N_t$−J sensing streams, the waveform to one or more network devices for MIMO communications and MIMO sensing. The network devices may include at least one user equipment (UE) or other network device(s) (e.g., a mobile device, an XR device such as a VR device, AR device, MR device etc., a wearable such as a network-connected watch etc., a vehicle or component or system of the vehicle, or other network device). In some aspects, the network entity (or component thereof) may reuse the communications resources for sensing the one or more network devices based on at least two of the one or more network devices being spatially correlated (e.g., spatially aligned with each other).

Figure 16:
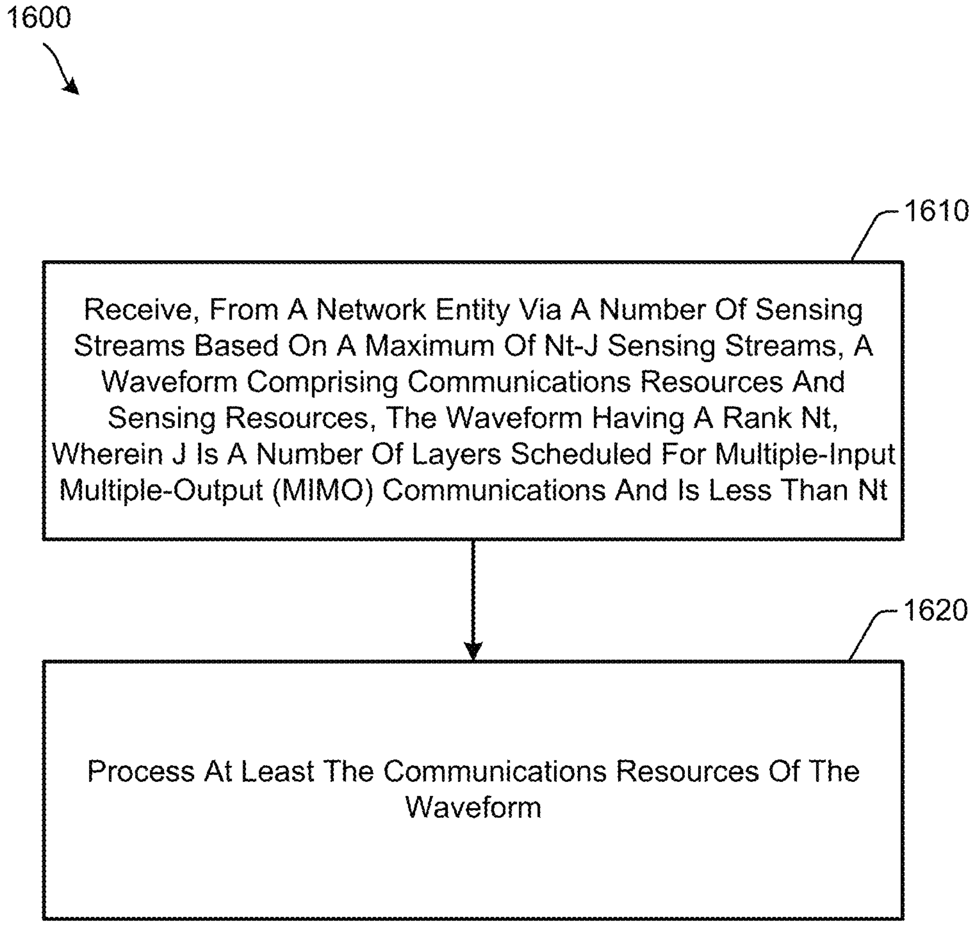
FIG. 16 is a flow chart illustrating another example of a process for wireless communications utilizing joint MIMO communications and MIMO sensing, in accordance with some aspects of the present disclosure.

FIG. 16 is a flow chart illustrating an example of a process 1600 for wireless communications utilizing joint MIMO communications and MIMO sensing. The process 1600 can be performed by a network device (e.g., a UE such as a mobile device, an XR device such as a VR device, AR device, MR device etc., a wearable such as a network-connected watch etc., a vehicle or component or system of the vehicle, or other network device) or by a component or system (e.g., a chipset) of the network device. The operations of the process 1600 may be implemented as software components that are executed and run on one or more processors (e.g., processor 1710 of FIG. 17 or other processor(s)). Further, the transmission and reception of signals by the wireless communications device in the process 1600 may be enabled, for example, by one or more antennas and/or one or more transceivers (e.g., wireless transceiver (s)).

At block 1610, the network device (or component thereof) may receive, from a network entity via a number of sensing streams based on a maximum of $N_t$−J sensing streams, a waveform including communications resources and sensing resources. For instance, the network entity may be a base station (e.g., a gNB, an eNB, etc.) or a CU, a DU, a RU, a Near-RT RIC, or a Non-RT RIC of a base station having a disaggregated architecture. The waveform has a rank $N_t$ and the network entity includes $N_t$ number of transmitting antenna elements. J is a number of layers scheduled for multiple-input multiple-output (MIMO) communications (e.g., multiple-user MIMO (MU-MIMO) communications) and is less than $N_t$. In some cases, the network entity includes at least one antenna array including the transmitting antenna elements.

In some aspects, the waveform is defined using a matrix $S_C$ and a matrix $S_A$, as described herein. For instance, the matrix $S_C$ may represent the communications resources and the matrix $S_A$ may represent the sensing resources. In one illustrative example, the matrix $S_C$ is rank J and the matrix $S_A$ is rank $N_t$−J. In some cases, the waveform includes a first waveform $W_C S_C$ associated with the communications resources and a second waveform $W_A S_A$ associated with the sensing resources, wherein $W_C$ and $W_A$ are matrices. In some examples, the first waveform $W_C S_C$ and the second waveform $W_A S_A$ are orthogonal to each other. In some aspects, the communications resources include communications data, and the sensing resources include no data.

In some cases, the waveform is scheduled by the network entity (or component thereof). In some cases, the waveform is scheduled by a radar server. In some aspects, the waveform is scheduled (e.g., by the network entity or component thereof, by the radar server, etc.) within a plurality of demodulation reference signal (DMRS) symbols. In such aspects, the $N_t$−J sensing streams may be orthogonal to a plurality of DMRS ports associated with the plurality of DMRS symbols. In some aspects, the waveform is scheduled (e.g., by the network entity or component thereof, by the radar server, etc.) within a plurality of physical downlink shared channel (PDSCH) symbols.

At block 1620, the network device (or component thereof) may process at least the communications resources of the waveform. In some aspects, the communications resources are reused (e.g., by the network entity, the network device, or other device or server) for sensing the one or more network devices based on at least two of the one or more network devices being spatially correlated (e.g., spatially aligned with each other).

Figure 17:
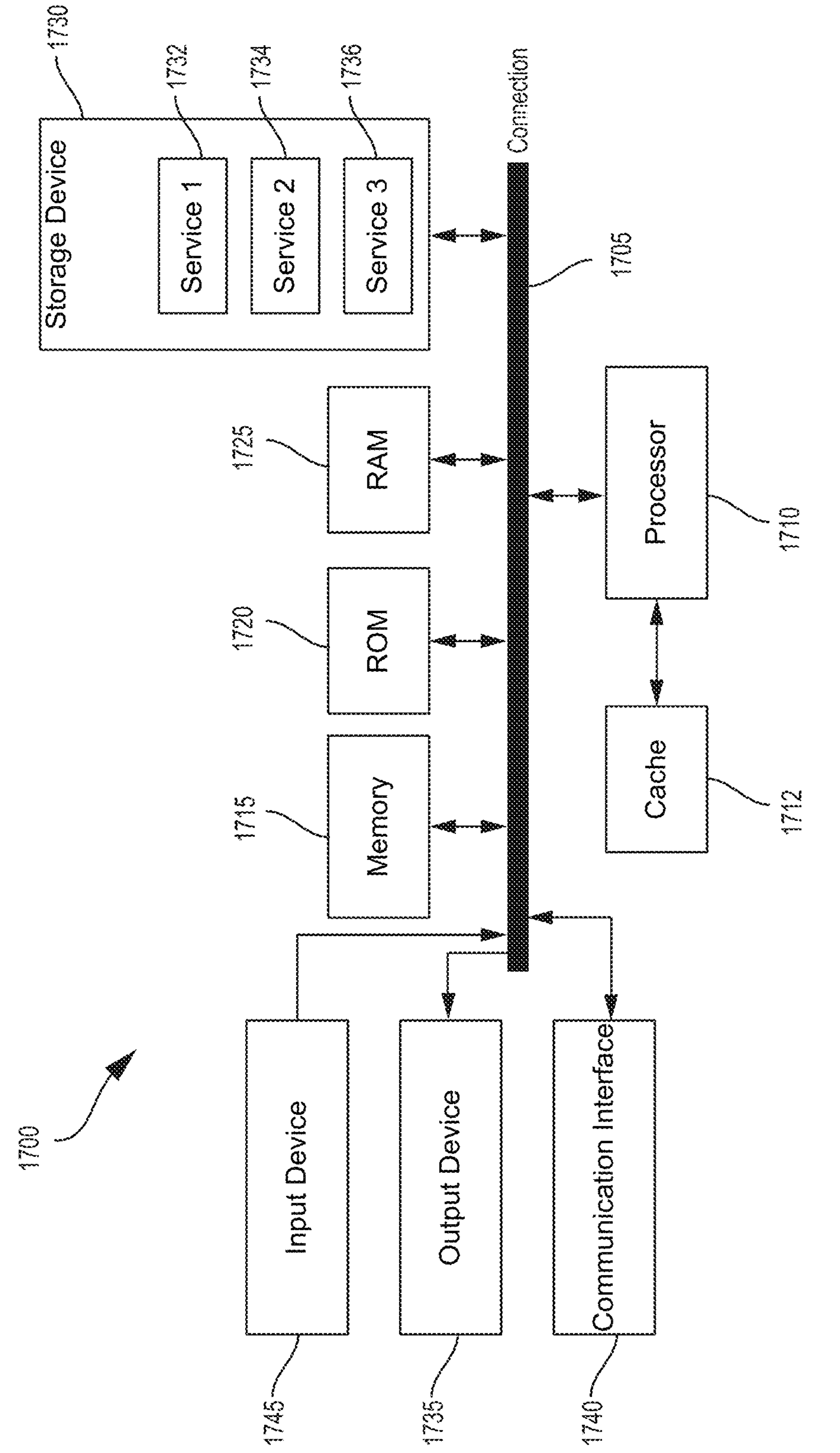
FIG. 17 is a block diagram illustrating an example of a computing system, which may be employed by the disclosed systems and techniques for joint MIMO communications and MIMO sensing, in accordance with some aspects of the present disclosure.

FIG. 17 is a block diagram illustrating an example of a computing system 1700, which may be employed by the disclosed systems and techniques for joint MIMO communications and MIMO sensing, in accordance with some aspects of the present disclosure. In particular, FIG. 17 illustrates an example of computing system 1700, which can be for example any computing device making up internal computing system, a remote computing system, a camera, or any component thereof in which the components of the system are in communication with each other using connection 1705. Connection 1705 can be a physical connection using a bus, or a direct connection into processor 1710, such as in a chipset architecture. Connection 1705 can also be a virtual connection, networked connection, or logical connection.

In some aspects, computing system 1700 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1700 includes at least one processing unit (CPU or processor) 1710 and connection 1705 that communicatively couples various system components including system memory 1715, such as read-only memory (ROM) 1720 and random access memory (RAM) 1725 to processor 1710. Computing system 1700 can include a cache 1712 of high-speed memory connected directly with, in close proximity to, or integrated as part of processor 1710.

Processor 1710 can include any general purpose processor and a hardware service or software service, such as services 1732, 1734, and 1736 stored in storage device 1730, configured to control processor 1710 as well as a special-purpose processor where software instructions are incorporated into the actual processor design. Processor 1710 may essentially be a completely self-contained computing system, containing multiple cores or processors, a bus, memory controller, cache, etc. A multi-core processor may be symmetric or asymmetric.

To enable user interaction, computing system 1700 includes an input device 1745, which can represent any number of input mechanisms, such as a microphone for speech, a touch-sensitive screen for gesture or graphical input, keyboard, mouse, motion input, speech, etc. Computing system 1700 can also include output device 1735, which can be one or more of a number of output mechanisms. In some instances, multimodal systems can enable a user to provide multiple types of input/output to communicate with computing system 1700.

Computing system 1700 can include communications interface 1740, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1740 may also include one or more range sensors (e.g., LIDAR sensors, laser range finders, RF radars, ultrasonic sensors, and infrared (IR) sensors) configured to collect data and provide measurements to processor 1710, whereby processor 1710 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1740 may also include one or more Global Navigation Satellite System (GNSS) receivers or transceivers that are used to determine a location of the computing system 1700 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L#) cache), resistive random-access memory (RRAM/ReRAM), phase change memory (PCM), spin transfer torque RAM (STT-RAM), another memory chip or cartridge, and/or a combination thereof.

The storage device 1730 can include software services, servers, services, etc., that when the code that defines such software is executed by the processor 1710, it causes the system to perform a function. In some aspects, a hardware service that performs a particular function can include the software component stored in a computer-readable medium in connection with the necessary hardware components, such as processor 1710, connection 1705, output device 1735, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1. An apparatus for wireless communications, the apparatus comprising: at least one memory; and at least one processor coupled to the at least one memory, the at least one processor configured to: receive, from a network entity via a number of sensing streams based on a maximum of $N_t$–J sensing streams, a waveform comprising communications resources and sensing resources, the waveform having a rank $N_t$, wherein J is a number of layers scheduled for multiple-input multiple-output (MIMO) communications and is less than $N_t$; and process at least the communications resources of the waveform.

Aspect 2. The apparatus of Aspect 1, wherein the waveform is defined using a matrix $S_C$ and a matrix $S_A$, wherein the matrix $S_C$ represents the communications resources and the matrix $S_A$ represents the sensing resources.

Aspect 3. The apparatus of Aspect 2, wherein the matrix $S_C$ is rank J.

Aspect 4. The apparatus of any of Aspects 2 or 3, wherein the matrix $S_A$ is rank $N_t$–J.

Aspect 5. The apparatus of any of Aspects 2 to 4, wherein the waveform comprises a first waveform WCSC associated with the communications resources and a second waveform WASA associated with the sensing resources, wherein WC and WA are matrices.

Aspect 6. The apparatus of Aspect 5, wherein the first waveform WCSC and the second waveform WASA are orthogonal to each other.

Aspect 7. The apparatus of any of Aspects 1 to 6, wherein the communications resources are reused for sensing one or more network devices based on at least two of the one or more network devices being spatially correlated.

Aspect 8. The apparatus of any of Aspects 1 to 7, wherein the MIMO communications are multiple-user MIMO (MU-MIMO) communications.

Aspect 9. The apparatus of any of Aspects 1 to 8, wherein the communications resources comprise communications data, and wherein the sensing resources comprise no data.

Aspect 10. The apparatus of any of Aspects 1 to 9, wherein the waveform is scheduled within a plurality of demodulation reference signal (DMRS) symbols, and wherein the $N_t$–J sensing streams are orthogonal to a plurality of DMRS ports associated with the plurality of DMRS symbols.

Aspect 11. The apparatus of any of Aspects 1 to 10, wherein the waveform is scheduled within a plurality of physical downlink shared channel (PDSCH) symbols.

Aspect 12. The apparatus of any of Aspects 1 to 11, wherein the network entity is a base station.

Aspect 13. The apparatus of Aspect 12, wherein the base station is one of a next generation node B (gNB) or an evolved node B (eNB).

Aspect 14. The apparatus of any of Aspects 1 to 13, wherein the network entity is at least one of a central unit (CU), a distributed unit (DU), a radio unit (RU), a Near-Real Time (Near-RT) RAN Intelligent Controller (RIC), or a Non-Real Time (Non-RT) RIC of a base station.

Aspect 15. The apparatus of any of Aspects 1 to 14, wherein the apparatus includes a user equipment (UE).

Aspect 16. The apparatus of any of Aspects 1 to 15, wherein the waveform is scheduled by the network entity or a radar server.

Aspect 17. A method for wireless communications at a user equipment (UE), the method comprising: receiving, at the UE from a network entity via a number of sensing streams based on a maximum of $N_t$–J sensing streams, a waveform comprising communications resources and sensing resources, the waveform having a rank $N_t$, wherein J is a number of layers scheduled for multiple-input multiple-output (MIMO) communications and is less than $N_t$; and processing at least the communications resources of the waveform.

Aspect 18. The method of Aspect 17, wherein the waveform is defined using a matrix $S_C$ and a matrix $S_A$, wherein the matrix $S_C$ represents the communications resources and the matrix $S_A$ represents the sensing resources.

Aspect 19. The method of any of Aspects 17 or 18, wherein the matrix $S_C$ is rank J.

Aspect 20. The method of any of Aspects 17 to 19, wherein the matrix $S_A$ is rank $N_t$–J.

Aspect 21. The method of any of Aspects 17 to 20, wherein the waveform comprises a first waveform $W_C S_C$ associated with the communications resources and a second waveform $W_A S_A$ associated with the sensing resources, wherein $W_C$ and $W_A$ are matrices.

Aspect 22. The method of Aspect 21, wherein the first waveform $W_C S_C$ and the second waveform $W_A S_A$ are orthogonal to each other.

Aspect 23. The method of any of Aspects 17 to 22, wherein the communications resources are reused for sensing one or more network devices based on at least two of the one or more network devices being spatially correlated.

Aspect 24. The method of any of Aspects 17 to 23, wherein the MIMO communications are multiple-user MIMO (MU-MIMO) communications.

Aspect 25. The method of any of Aspects 17 to 24, wherein the communications resources comprise communications data, and wherein the sensing resources comprise no data.

Aspect 26. The method of any of Aspects 17 to 25, wherein the waveform is scheduled within a plurality of demodulation reference signal (DMRS) symbols, and wherein the $N_t$–J sensing streams are orthogonal to a plurality of DMRS ports associated with the plurality of DMRS symbols.

Aspect 27. The method of any of Aspects 17 to 26, wherein the waveform is scheduled within a plurality of physical downlink shared channel (PDSCH) symbols.

Aspect 28. The method of any of Aspects 17 to 27, wherein the network entity is a base station.

Aspect 29. The method of Aspect 28, wherein the base station is one of a next generation node B (gNB) or an evolved node B (eNB).

Aspect 30. The method of any of Aspects 17 to 29, wherein the network entity is at least one of a central unit (CU), a distributed unit (DU), a radio unit (RU), a Near-Real Time (Near-RT) RAN Intelligent Controller (RIC), or a Non-Real Time (Non-RT) RIC of a base station.

Aspect 31. The method of any of Aspects 17 to 30, wherein the waveform is scheduled by a radar server by the network entity.

Aspect 32. The method of any of Aspects 17 to 30, wherein the waveform is scheduled by a radar server.

Aspect 33. An apparatus for wireless communications, the apparatus comprising: at least one memory; and at least one processor coupled to at least one memory, the at least one processor configured to: generate a waveform comprising communications resources and sensing resources based on a maximum of $N_t$–J sensing streams, the waveform having a rank $N_t$, wherein the apparatus comprises $N_t$ number of transmitting antenna elements, and wherein J is a number of layers scheduled for multiple-input multiple-output (MIMO) communications and is less than $N_t$; and transmit, via a number of sensing streams based on the maximum of $N_t$–J sensing streams, the waveform to one or more network devices for MIMO communications and MIMO sensing.

Aspect 34. The apparatus of Aspect 33, wherein the waveform is defined using a matrix $S_C$ and a matrix $S_A$, wherein the matrix $S_C$ represents the communications resources and the matrix $S_A$ represents the sensing resources.

Aspect 35. The apparatus of any of Aspects 33 or 34, wherein the matrix $S_C$ is rank J.

Aspect 36. The apparatus of any of Aspects 33 to 35, wherein the matrix $S_A$ is rank $N_t$–J.

Aspect 37. The apparatus of any of Aspects 33 to 36, wherein the waveform comprises a first waveform $W_C S_C$ associated with the communications resources and a second waveform $W_A S_A$ associated with the sensing resources, wherein $W_C$ and $W_A$ are matrices.

Aspect 38. The apparatus of Aspect 37, wherein the first waveform WCSC and the second waveform $W_A S_A$ are orthogonal to each other.

Aspect 39. The apparatus of any of Aspects 33 to 38, wherein the at least one processor is configured to: reuse the communications resources for sensing the one or more network devices based on at least two of the one or more network devices being spatially correlated.

Aspect 40. The apparatus of any of Aspects 33 to 39, wherein the MIMO communications are multiple-user MIMO (MU-MIMO) communications.

Aspect 41. The apparatus of any of Aspects 33 to 40, wherein the communications resources comprise communications data, and wherein the sensing resources comprise no data.

Aspect 42. The apparatus of any of Aspects 33 to 41, wherein the apparatus comprises at least one antenna array including the transmitting antenna elements.

Aspect 43. The apparatus of any of Aspects 33 to 42, wherein the waveform is scheduled within a plurality of demodulation reference signal (DMRS) symbols, and wherein the $N_t$–J sensing streams are orthogonal to a plurality of DMRS ports associated with the plurality of DMRS symbols.

Aspect 44. The apparatus of any of Aspects 33 to 43, wherein the waveform is scheduled within a plurality of physical downlink shared channel (PDSCH) symbols.

Aspect 45. The apparatus of any of Aspects 33 to 44, wherein the apparatus is a base station.

Aspect 46. The apparatus of Aspect 45, wherein the base station is one of a next generation node B (gNB) or an evolved node B (eNB).

Aspect 47. The apparatus of any of Aspects 33 to 46, wherein the apparatus is at least one of a central unit (CU), a distributed unit (DU), a radio unit (RU), a Near-Real Time (Near-RT) RAN Intelligent Controller (RIC), or a Non-Real Time (Non-RT) RIC of a base station.

Aspect 48. The apparatus of any of Aspects 33 to 47, wherein the one or more network devices includes at least one user equipment (UE).

Aspect 49. The apparatus of any of Aspects 33 to 48, wherein the at least one processor is configured to: schedule the waveform.

Aspect 50. The apparatus of any of Aspects 33 to 48, wherein the waveform is scheduled by a radar server.

Aspect 51. A method for wireless communications at a network entity, the method comprising: generating, at the network entity, a waveform comprising communications resources and sensing resources based on a maximum of $N_t$–J sensing streams, the waveform having a rank $N_t$, wherein the network entity comprises $N_t$ number of transmitting antenna elements, and wherein J is a number of layers scheduled for multiple-input multiple-output (MIMO) communications and is less than $N_t$; and transmitting, via a number of sensing streams based on the maximum of $N_t$–J sensing streams, the waveform to one or more network devices for MIMO communications and MIMO sensing.

Aspect 52. The method of Aspect 51, wherein the waveform is defined using a matrix $S_C$ and a matrix $S_A$, wherein the matrix $S_C$ represents the communications resources and the matrix $S_A$ represents the sensing resources.

Aspect 53. The method of any of Aspects 51 or 52, wherein the matrix $S_C$ is rank J.

Aspect 54. The method of any of Aspects 51 to 53, wherein the matrix $S_A$ is rank $N_t$–J.

Aspect 55. The method of any of Aspects 51 to 54, wherein the waveform comprises a first waveform $W_CS_C$ associated with the communications resources and a second waveform $W_AS_A$ associated with the sensing resources, wherein $W_C$ and $W_A$ are matrice.

Aspect 56. The method of Aspect 55, wherein the first waveform $W_CS_C$ and the second waveform $W_AS_A$ are orthogonal to each other.

Aspect 57. The method of any of Aspects 51 to 56, further comprising reusing the communications resources for sensing the one or more network devices based on at least two of the one or more network devices being spatially correlated.

Aspect 58. The method of any of Aspects 51 to 57, wherein the MIMO communications are multiple-user MIMO (MU-MIMO) communications.

Aspect 59. The method of any of Aspects 51 to 58, wherein the communications resources comprise communications data, and wherein the sensing resources comprise no data.

Aspect 60. The method of any of Aspects 51 to 59, wherein the network entity comprises at least one antenna array including the transmitting antenna elements.

Aspect 61. The method of any of Aspects 51 to 60, wherein the waveform is scheduled within a plurality of demodulation reference signal (DMRS) symbols, and wherein the $N_t$–J sensing streams are orthogonal to a plurality of DMRS ports associated with the plurality of DMRS symbols.

Aspect 62. The method of any of Aspects 51 to 61, wherein the waveform is scheduled within a plurality of physical downlink shared channel (PDSCH) symbols.

Aspect 63. The method of any of Aspects 51 to 62, wherein the network entity is a base station.

Aspect 64. The method of Aspect 63, wherein the base station is one of a next generation node B (gNB) or an evolved node B (eNB).

Aspect 65. The method of any of Aspects 51 to 64, wherein the network entity is at least one of a central unit (CU), a distributed unit (DU), a radio unit (RU), a Near-Real Time (Near-RT) RAN Intelligent Controller (RIC), or a Non-Real Time (Non-RT) RIC of a base station.

Aspect 66. The method of any of Aspects 51 to 65, wherein the one or more network devices includes at least one user equipment (UE).

Aspect 67. The method of any of Aspects 51 to 66, further comprising: scheduling, at the network entity, the waveform.

Aspect 68. The method of any of Aspects 51 to 66, wherein the waveform is scheduled by a radar server.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. An apparatus for wireless communications, the apparatus comprising:

at least one memory; and at least one processor coupled to the at least one memory, the at least one processor configured to:

receive, from a network entity via a number of sensing streams based on a maximum number of sensing streams, a waveform comprising communications resources and sensing resources, wherein the maximum number of sensing streams is based on a rank of the waveform and a number of layers scheduled for multiple-input multiple-output (MIMO) communications; and process at least the communications resources of the waveform.

2. The apparatus of claim 1, wherein the number of layers scheduled for the MIMO communications is less than the rank.

3. The apparatus of claim 1, wherein the waveform comprises a first waveform associated with the communications resources and a second waveform associated with the sensing resources.

4. The apparatus of claim 3, wherein the waveform and the second waveform are orthogonal to each other.

5. The apparatus of claim 1, wherein the waveform is scheduled within a plurality of physical downlink shared channel (PDSCH) symbols.

6. The apparatus of claim 1, wherein the at least one processor is configured to:

receive, from a network entity, information associated with the number of sensing streams, the information comprising at least one of additional antenna ports allocated for the number of sensing streams, time and frequency resources including the sensing resources, parameters for each sensing waveform for each layer of the number of sensing streams, or a power offset between physical downlink shared channel (PDSCH) and the number of sensing streams.

7. The apparatus of claim 1, wherein the waveform is defined using a first matrix and a second matrix, wherein the first matrix represents the communications resources and the second matrix represents the sensing resources.

8. The apparatus of claim 7, wherein the first matrix has a rank equal to the number of layers scheduled for the MIMO communications.

9. The apparatus of claim 7, wherein the second matrix is equal to the rank minus the number of layers scheduled for the MIMO communications.

10. The apparatus of claim 1, wherein the communications resources are reused for sensing one or more network devices based on at least two of the one or more network devices being spatially correlated.

11. The apparatus of claim 1, wherein the MIMO communications are multiple-user MIMO (MU-MIMO) communications.

12. The apparatus of claim 1, wherein the communications resources comprise communications data, and wherein the sensing resources comprise no data.

13. The apparatus of claim 1, wherein the network entity is a base station.

14. The apparatus of claim 13, wherein the base station is one of a next generation node B (gNB) or an evolved node B (eNB).

15. The apparatus of claim 1, wherein the network entity is at least one of a central unit (CU), a distributed unit (DU), a radio unit (RU), a Near-Real Time (Near-RT) RAN Intelligent Controller (RIC), or a Non-Real Time (Non-RT) RIC of a base station.

16. The apparatus of claim 1, wherein the apparatus includes a user equipment (UE).

17. The apparatus of claim 1, wherein the waveform is scheduled by the network entity or a radar server.

18. A method for wireless communications, the method comprising:

receiving, from a network entity via a number of sensing streams based on a maximum number of sensing streams, a waveform comprising communications resources and sensing resources, wherein the maximum number of sensing streams is based on a rank of the waveform and a number of layers scheduled for multiple-input multiple-output (MIMO) communications; and processing at least the communications resources of the waveform.

19. The method of claim 18, wherein the waveform comprises a first waveform associated with the communications resources and a second waveform associated with the sensing resources, and wherein the first waveform and the second waveform are orthogonal to each other.

20. The method of claim 18, wherein waveform is scheduled within a plurality of physical downlink shared channel (PDSCH) symbols.

* * * * *